(12) United States Patent
Charvat et al.

(10) Patent No.: US 10,090,944 B1
(45) Date of Patent: Oct. 2, 2018

(54) WIDE BAND RADIO-FREQUENCY LOCALIZATION DEVICES AND ASSOCIATED SYSTEMS AND METHODS

(71) Applicant: Humatics Corporation, Cambridge, MA (US)

(72) Inventors: Gregory L. Charvat, Guilford, CT (US); Andrew Habib Zai, Sudbury, MA (US); Christopher Ryan Montoya, Waltham, MA (US)

(73) Assignee: Humatics Corporation, Cambridge, MA (US)

( * ) Notice: Subject to any disclaimer, the term of this patent is extended or adjusted under 35 U.S.C. 154(b) by 0 days.

(21) Appl. No.: 15/954,968

(22) Filed: Apr. 17, 2018

Related U.S. Application Data

(60) Provisional application No. 62/629,581, filed on Feb. 12, 2018.

(51) Int. Cl.
| | |
|---|---|
| *H04B 5/00* | (2006.01) |
| *H04B 17/27* | (2015.01) |
| *H04B 1/50* | (2006.01) |
| *H04B 1/00* | (2006.01) |

(52) U.S. Cl.
CPC ........... *H04B 17/27* (2015.01); *H04B 1/0053* (2013.01); *H04B 1/50* (2013.01)

(58) Field of Classification Search
CPC ...... H04B 5/00; H04B 5/0056; H04B 5/0062; H04B 5/0068; H04B 7/00; H04B 7/26
See application file for complete search history.

(56) References Cited

U.S. PATENT DOCUMENTS

| | | | | |
|---|---|---|---|---|
| 7,039,359 | B2 * | 5/2006 | Martinez | G01S 13/825 455/41.2 |
| 7,199,713 | B2 * | 4/2007 | Barink | G06K 7/0008 340/10.1 |
| 8,315,562 | B2 * | 11/2012 | Duron | G06K 7/0008 235/462.13 |
| 9,520,902 | B2 * | 12/2016 | Chang | G06K 7/10009 |
| 9,768,837 | B2 * | 9/2017 | Charvat | H04B 5/0056 |
| 9,797,986 | B2 * | 10/2017 | Gassion | G01S 1/08 |
| 2007/0159303 | A1 * | 7/2007 | Tyulpanov | G06K 7/0008 340/10.4 |
| 2013/0122813 | A1 * | 5/2013 | Finkenzeller | G06K 7/0008 455/41.2 |

* cited by examiner

*Primary Examiner* — Blane Jackson
(74) *Attorney, Agent, or Firm* — Wolf, Greenfield & Sacks, P.C.

(57) ABSTRACT

A device comprising: a radio frequency (RF) coupler comprising input, output, and coupled ports; an antenna capable of receiving RF signals having a first center frequency and transmitting RF signals having a second center frequency, the antenna connected to the RF coupler to provide received RF signals to the input port of the RF coupler and transmit RF signals received at the input port via coupling to signals received at the coupled port; and signal transformation circuitry having an input connected to the output port of the RF coupler to receive RF signals provided by the antenna to the input port and an output connected to the coupled port, the signal transformation circuitry configured to transform first RF signals having the first center frequency received from the output port to second RF signals having the second center frequency and to provide them to the coupled port.

21 Claims, 12 Drawing Sheets

WIDE BAND RADIO-FREQUENCY LOCALIZATION DEVICES AND ASSOCIATED SYSTEMS AND METHODS

RELATED APPLICATIONS

This application claims the benefit under 35 U.S.C. § 119(e) of U.S. Provisional Application Ser. No. 62/629,581, titled "WIDE BAND RADIO-FREQUENCY LOCALIZATION DEVICES AND ASSOCIATED SYSTEMS AND METHODS", filed on Feb. 12, 2018, which is incorporated by reference herein in its entirety.

BACKGROUND

The ability to accurately determine the location of an object or target has potential benefits for numerous applications. Some exemplary applications benefitting from object localization include motion tracking, virtual reality, gaming, autonomous systems, robotics, etc. A number of technologies have been pursued that seek to provide localization, including global positioning system (GPS) technology, received signal strength indicator (RSSI) measurements, optical image data processing techniques, infrared ranging, etc. Generally, these conventional approaches are limited in application due to one or more deficiencies, including relatively poor or insufficient accuracy and/or precision, computational complexity resulting in relatively long refresh rates, environmental limitations (e.g., operation limited to outdoors, cellular or network access requirements and/or vulnerability to background clutter or noise), cost, size, etc.

SUMMARY

Some embodiments provide for a device, comprising: a radio frequency (RF) coupler comprising an input port, an output port and a coupled port; an antenna capable of receiving RF signals having a first center frequency and transmitting RF signals having a second center frequency different from the first center frequency, the antenna connected to the RF coupler to provide received RF signals to the input port of the RF coupler and to transmit RF signals received at the input port via coupling to signals received at the coupled port; and signal transformation circuitry having an input connected to the output port of the RF coupler to receive RF signals provided by the antenna to the input port and an output connected to the coupled port, the signal transformation circuitry configured to transform first RF signals having the first center frequency received from the output port to second RF signals having the second center frequency and to provide the second RF signals to the coupled port.

Some embodiments provide for a method performed by a device comprising a radio frequency (RF) antenna, an RF coupler having an input port, and output port, and a coupled port, and signal transformation circuitry. The method comprises: receiving, via the RF antenna, a wireless RF signal having a first center frequency; providing, from the RF antenna to the input port of the RF coupler, a first RF signal generated based on the wireless RF signal and having the first center frequency; and generating, using the RF coupler and based on the first RF signal, a second RF signal having the first center frequency and providing the second RF signal to the signal transformation circuitry via the output port of the RF coupler; generating, using the signal transformation circuitry and based on the second RF signal, a third RF signal having the second center frequency and providing the third RF signal to the coupled port of the RF coupler; and generating, using the RF coupler, a fourth RF signal having the second center frequency and providing the fourth RF signal to the RF antenna via the input port of the RF coupler.

In some embodiments, the RF coupler comprises: a main line having the input port at a first end and the output port at a second end; and a coupled line having the coupled port at a first end and an isolated port at a second end.

In some embodiments, the antenna is connected to the RF coupler to provide received RF signals to the input port of the RF coupler and to transmit RF signals received from the input port via coupling of the main line and the coupled line.

In some embodiments, the main line and the coupled line are coupled transmission lines. In some embodiments, the main line and the coupled line comprise striplines. In some embodiments, the main line and the coupled line comprise microstrips. In some embodiments, the main line and the coupled line have a coupling loss of 5-15 dB.

In some embodiments, the antenna is configured to receive, from an interrogator device different from the device, RF signals having the first center frequency and to transmit, to the interrogator device, RF signals having the second center frequency different from the first center frequency.

In some embodiments, the antenna is configured to receive RF signals in a range of 4.0-7.5 GHz and transmit RF signals in a range of 8.0-15 GHz.

In some embodiments, the antenna is configured to receive C-band RF signals and transmit X-band RF signals. In some embodiments, the antenna is configured to receive RF signals in a range of 50-70 GHz and transmit RF signals in a range of 100-140 GHz.

In some embodiments, the antenna comprises an Archimedean spiral antenna, an exponential spiral antenna, a sinuous antenna, or a log-periodic antenna. In some embodiments, the antenna comprises a circularly polarized antenna. In some embodiments, the antenna is a single-port antenna.

In some embodiments, the signal transformation circuitry comprises at least one frequency multiplier. In some embodiments, the signal transformation circuitry is configured to transform first RF signals having the first center frequency received to second RF signals having the second center frequency that is a harmonic of the first center frequency. In some embodiments, the harmonic is the first harmonic of the first center frequency.

Some embodiments, provide for an interrogator device, comprising: a radio frequency (RF) coupler comprising an input port, an output port and a coupled port; an antenna capable of transmitting RF signals having a first center frequency and transmitting RF signals having a second center frequency different from the first center frequency, the antenna connected to the RF coupler to provide received RF signals to the input port of the RF coupler and to transmit RF signals received at the input port via coupling to signals received at the coupled port; transmit circuitry having an output connected to the coupled port of the RF coupler, the transmit circuitry configured to generate the RF signals having the first center frequency for transmission by the antenna; and receive circuitry having an input connected to the output port of the RF coupler, the receive circuitry configured to obtain, via the output port of the RF coupler, a version of the RF signals having the second center frequency received by the antenna.

BRIEF DESCRIPTION OF DRAWINGS

Various aspects and embodiments will be described with reference to the following figures. It should be appreciated that the figures are not necessarily drawn to scale.

DETAILED DESCRIPTION

Figure 1:
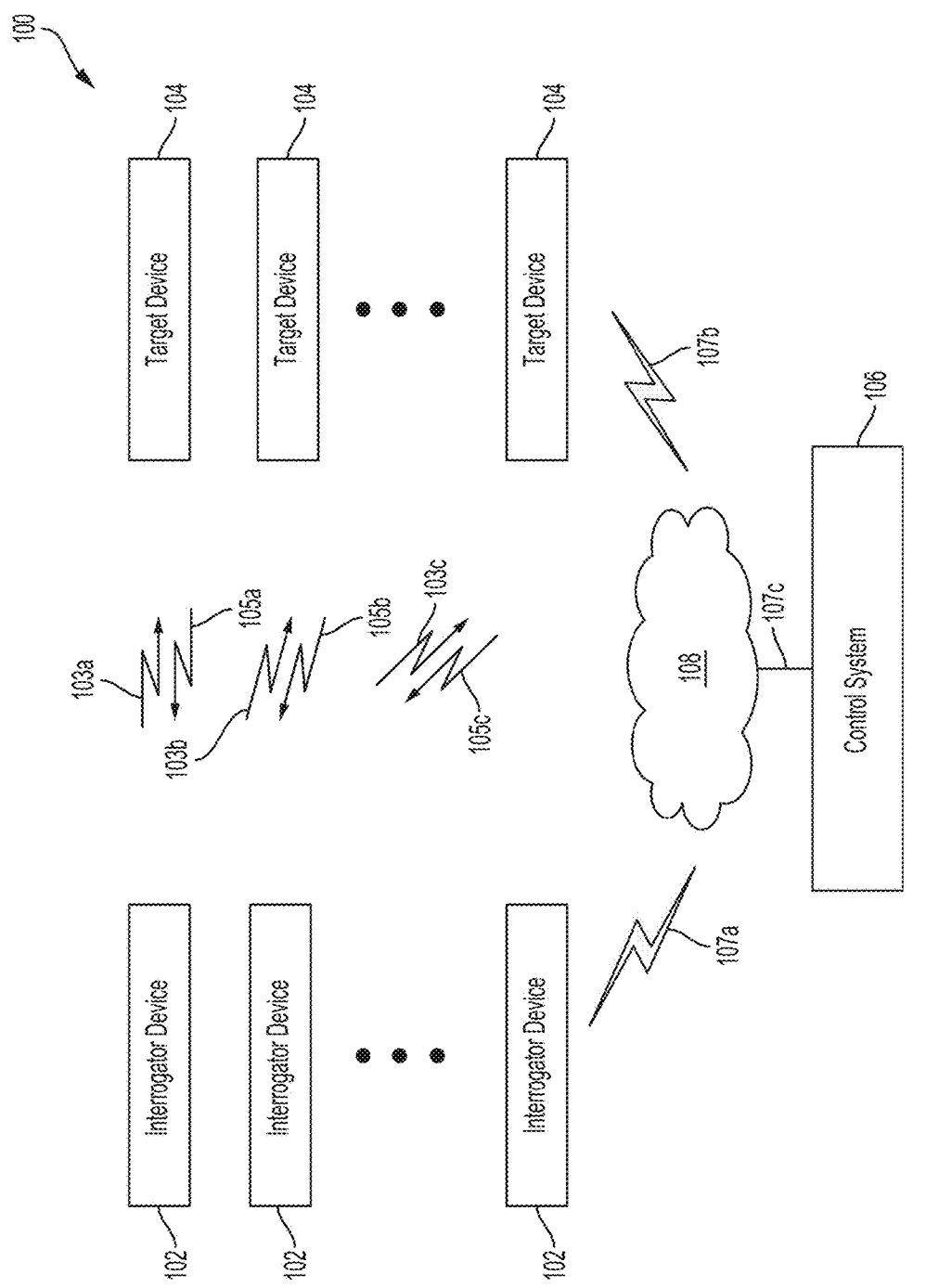
FIG. 1 shows an illustrative system 100 that may be used to implement radio frequency (RF) localization techniques, in accordance with some embodiments of the technology described herein.

Determining the location of an object or target (also referred to herein as localization) has an array of applications in a number of fields. For example, the ability to locate and/or track an object at very small scales (i.e., at high resolutions) facilitates advancement of numerous applications, and has wide spread applicability to a number of different fields. For example, the ability to accurately and precisely track an object or target in real-time has numerous benefits in the gaming industry and, in particular, for interactive video games. Object localization also has many applications in autonomous systems, such as autonomous vehicle navigation, exploration, robotics and human machine interaction. Virtual reality, motion tracking and capture and the like also benefit from the ability to locate and/or track object(s) accurately, robustly and in real-time or near real-time. Details of using localization techniques in a variety of applications are described in U.S. patent application Ser. No. 15/181,930 titled "High-Precision Time of Flight Measurement Systems," filed on Jun. 14, 2016, U.S. patent application Ser. No. 15/181,956 titled "High Precision Motion Tracking with Time of Flight Measurement Systems," filed on Jun. 14, 2016, U.S. patent application Ser. No. 15/181,978 titled "High Precision Subsurface Imaging and Location Mapping with Time of Flight Measurement Systems," filed on Jun. 14, 2016, and U.S. patent Ser. No. 15/181,999 titled "High-Precision Time of Flight Measurement System for Industrial Automation," filed on Jun. 14, 2016, each of which is herein incorporated by reference in its entirety.

For many applications, high localization accuracy (resolution) is an important capability and is a limiting factor for many conventional localization techniques. The inventors have developed localization techniques with the ability to resolve the location of a target in the millimeter and sub-millimeter range, referred to herein generally as micro-localization. According to some embodiments, a micro-localization system comprises an interrogator configured to transmit a radio frequency (RF) signal (e.g., a microwave or millimeter wave RF signal) and a target device configured to, in response to receiving the RF signal, transmit an RF signal to be received by the interrogator. The RF signal received from the target device by the interrogator is used to determine the distance between the interrogator and the target device.

In some micro-location systems, the interrogator and target device may each include a pair of RF antennas to communicate with the other device. For example, the interrogator may have a transmit and a receive antenna and the target device may have its own transmit and receive antenna. The interrogator may use its transmit antenna to transmit an RF signal, which the target device may receive using its receive antenna. In response to receiving the RF signal, the target device may use its transmit antenna to transmit a responsive RF signal to be received by the interrogator's receive antenna.

Multi-path errors present a significant challenge to achieving micro-localization in many, if not most, of the environments where micro-location systems are utilized. To mitigate multi-path errors, the bandwidth of the system may be increased. However, increasing the bandwidth brings its own set of challenges that must be addressed. The inventors have developed techniques to facilitate wide band micro-localization. In particular, the inventors have developed antenna, transmit and receive systems configured for wide band operation, thus allowing for significant mitigation of multi-path errors, examples of which are described in further detail below.

The inventors have recognized that micro-location systems may be improved if the target device and the interrogator device were each to utilize a single RF antenna to communicate with the other device. Utilizing a single RF antenna on a target device instead of multiple RF antennas has a number of advantages. (Using a single RF antenna on an interrogator device instead of multiple RF antennas has similar advantages). First, using a single RF antenna reduces the cost of manufacturing the target device. Second, using a single RF antenna improves the sensitivity of the target device because it eliminates any interference and/or coupling that would have existed between the receive and transmit antennas. For example, in some embodiments where the target device receives RF signals having a first center frequency and transmits RF signals having a second center frequency that is a harmonic center frequency, there may be harmonic coupling between separate transmit and receive antennas, which reduces their sensitivity. Reducing the sensitivity of the target device's receive sensitivity due to the presence of interference (e.g., due to harmonic coupling) would reduce the range at which distance to and/or the location of the target device could be precisely determined. This problem would be eliminated with the use of a single RF antenna on the target device.

Third, using a single RF antenna on the target device would facilitate high-precision localization. After transmitting an RF signal from an interrogator device to the single RF antenna on the target device and receiving a responsive RF signal from that single RF antenna, the transmitted RF signal and the responsive RF signal may be used to determine the distance from the interrogator device to the phase center of the single RF antenna. Since an RF antenna may be much smaller than the size of the target device, this facilitates determining the distance(s) from one or more interrogators to the phase center of the single RF antenna with high accuracy, which in turn allows for the determination of the location of the RF antenna's phase center with high resolution.

Accordingly, some embodiments provide for a target device having a single RF antenna configured to receive RF signals from one or more interrogator devices and transmit responsive RF signals to the interrogator device(s). Additionally or alternatively, in some embodiments, the interrogator device may also have a single RF antenna for communicating with one or more target devices.

In order to reduce the effect of clutter on the performance of the micro-localization system and to increase the system's sensitivity, in some embodiments, a target device may be configured to receive RF signals having a first center frequency and respond with RF signals having a second center frequency different from the first center frequency. The second center frequency may be a harmonic of (e.g., a first harmonic) of the first center frequency. For example, a target device may be configured to receive RF signals having a center frequency in the range of 4-7.5 GHz and respond with RF signals having a center frequency in the range of 8-15 GHz. To this end, a target device may have signal transformation circuitry configured to transform RF signals having the first center frequency to RF signals having the second center frequency.

In some embodiments, in order to use a single wideband RF antenna with the above-described signal transformation circuitry, the target device may use an RF coupler comprising an input port, an output port, and a coupled port.

In such embodiments, the target device may comprise: (1) an RF coupler comprising an input port, an output port, and a coupled port; (2) an RF antenna (e.g., a single-port RF antenna) capable of receiving RF signals having a first center frequency (e.g., a C-band signal) and transmitting RF signals having a second center frequency different from the first center frequency (e.g., an X-band signal), the antenna connected to the RF coupler to provide received RF signals to the input port of the RF coupler and to transmit RF signals received at the input port via coupling to signals received at the coupled port; and (3) signal transformation circuitry having an input connected to the output port of the RF coupler to receive RF signals provided by the antenna to the input port and an output connected to the coupled port, the signal transformation circuitry configured to transform first RF signals having the first center frequency received from the output port to second RF signals having the second center frequency and to provide the second RF signals to the coupled port.

In the above described configuration, which is further illustrated and discussed in detail below including with reference to FIGS. 3A and 3B, no loss is incurred by the coupler when receiving RF signals from one or more interrogator devices, which maximizes the range at which the micro location system can locate the target device with high resolution. Any losses that are incurred through the coupling may be addressed through amplification on the target device, as described herein, and would not impact the range of the micro-location system. By contrast, using a splitter instead of an RF coupler, would incur at least a 3 dB loss on the received RF signals thereby reducing the maximum range at which the micro location system could locate the target device with high resolution.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1 shows an illustrative micro-localization system 100 that may be used to implement radio frequency (RF) localization techniques, in accordance with some embodiments of the technology described herein. Micro-localization system 100 comprises a plurality of interrogator devices 102, one or more of which are configured to transmit an RF signal 103 (e.g., RF signals 103a, 103b, 103c, etc.). System 100 also comprises one or more target devices 104 configured to receive RF signals 103 and, in response, transmit RF signals 105 (e.g., RF signals 105a, 105b and 105c, etc.). Interrogator devices 102 are configured to receive RF signals 105 that are then used to determine distances between respective interrogator and target devices. The computed distances may be used to determine the location of one or more target devices 104, a number of techniques of which are described in further detail below. It should be appreciated that while multiple target devices 104 are illustrated in FIG. 1A, a single target device may be utilized. More generally, it should be appreciated that any number of interrogator devices 102 and target devices 104 may be used, as the aspects of the technology described herein are not limited in this respect.

Micro-localization system 100 may also include a controller 106 configured to communicate with interrogator devices 102 and target devices 104 via communication channel 108, which may include a network, device-to-device communication channels, and/or any other suitable means of communication. Controller 106 may be configured to coordinate the transmission and/or reception of RF signals 103 and 105 between desired interrogator and target devices via communication channels 107a, 107b and 108, which may be a single communication channel or include multiple communication channels. Controller 106 may also be configured to determine the location of one or more target devices 104 from information received from interrogator devices 102. Controller 106 may be implemented as a standalone controller or may be implemented in full or in part by one or more interrogator devices 102 and/or target devices 104. Different exemplary configurations and implementations for micro-localization system 100 are described in further detail below, but are not limited to the configurations discussed herein.

Resolving the location of a target with a high degree of accuracy depends in part on receiving the RF signals transmitted by the target with high fidelity and, in part, on the ability to distinguish the RF signals transmitted by a target device from RF signals transmitted by an interrogator device, background clutter, and/or noise. The inventors have developed techniques for improving the signal-to-noise ratio of the signals received by the interrogator and target devices to facilitate micro-localization of one or more target devices. As one example, the inventors recognized that by configuring the interrogator and target devices to transmit at different frequencies, localization performance could be improved. According to some embodiments, one or more interrogator devices transmit first RF signals (e.g., RF signals 103) having a first center frequency and, in response to receiving the first RF signals, one or more target devices transmit second RF signals (e.g., RF signals 105) having a second center frequency different from the first center frequency. In this manner, receive antennas on the one or more interrogator devices can be configured to respond to RF signals about the second center frequency, improving the ability of the interrogator devices to receive RF signals from target devices in cluttered and/or noisy environments.

The inventors further recognized that relatively simple and/or cost effective circuitry could be implemented at the target device to transform RF signals having a first center frequency received from an interrogator device to RF signals having a second center frequency different from the first center frequency for transmission. According to some embodiments, the second center frequency is harmonically related to the first center frequency. For example, in system 100 illustrated in FIG. 1A, a target device 104 may be configured to transform RF signals 103 and transmit RF signals 105 at a harmonic (e.g., a first harmonic, a second harmonic, etc.) of the center frequency of the received RF signal 103. According to other embodiments, a target device transforms RF signals having a first center frequency received from an interrogator device to RF signals having second center frequency that is different from, but not harmonically related to the first center frequency. In other embodiments, a target device is configured to generate RF signals at a second center frequency different from the first center frequency, either harmonically or not harmonically related, rather than transforming RF signals received from an interrogator device. Exemplary techniques for transmitting RF signals, from interrogator and target devices, having different respective center frequencies are discussed in more detail herein.

Figure 2:
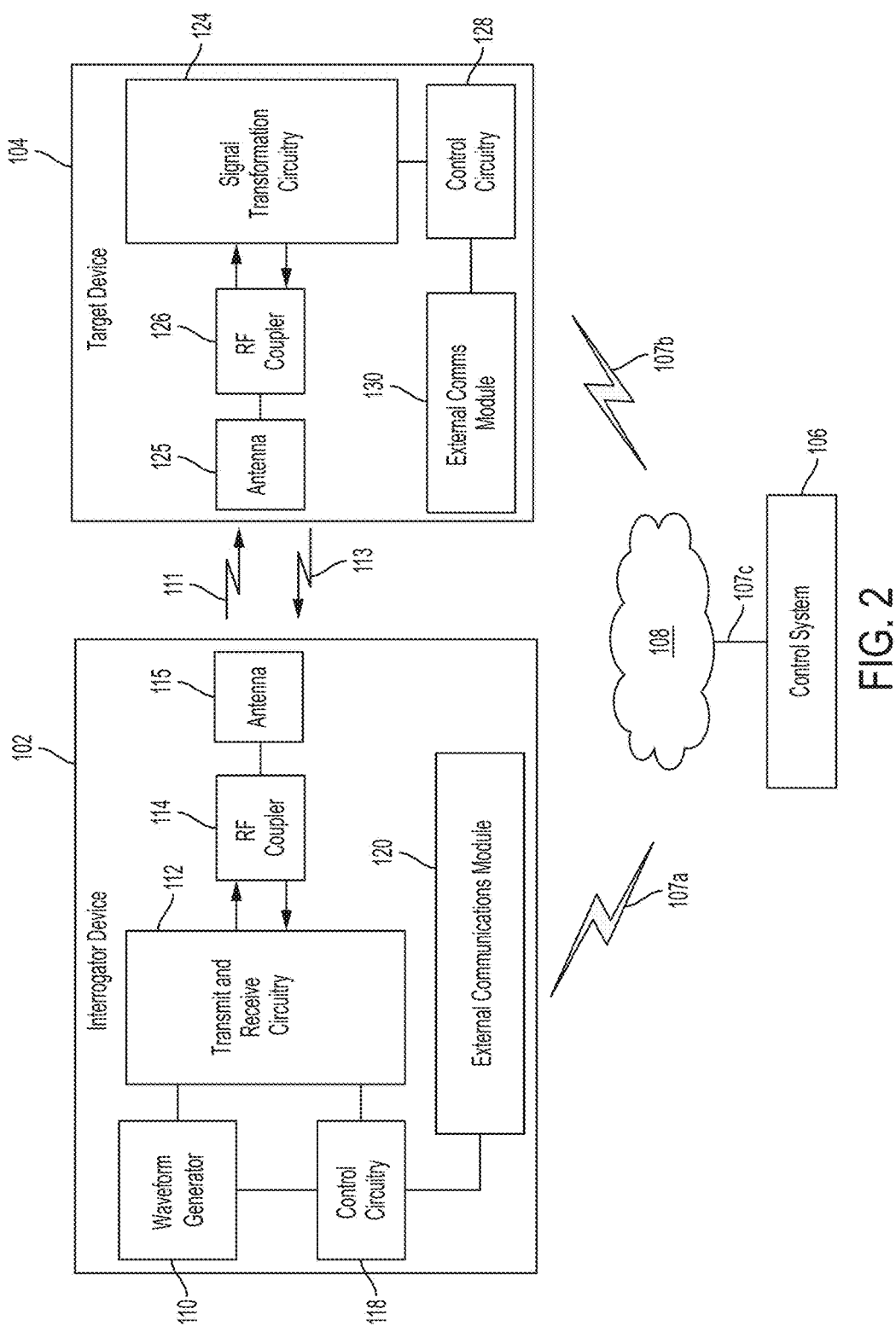
FIG. 2 shows illustrative components of an interrogator device and a target device, which are part of the illustrative system 100 shown in FIG. 2, in accordance with some embodiments of the technology described herein.

FIG. 2 shows illustrative components of an illustrative interrogator device 102 and a illustrative target device 104, which are part of the illustrative system 100 shown in FIG. 1, in accordance with some embodiments of the technology described herein. As shown in FIG. 2, illustrative interrogator device 102 includes waveform generator 110, transmit and receive circuitry 112, RF coupler 114, antenna 115, control circuitry 118, and external communications module 120. It should be appreciated that, in some embodiments, an interrogator device may include one or more other components in addition to or instead of the components illustrated in FIG. 2.

In some embodiments, waveform generator 110 may be configured to generate RF signals to be transmitted by the interrogator 102 using antenna 115. Waveform generator 110 may be configured to generate any suitable type(s) of RF signals. In some embodiments, waveform generator 110 may be configured to generate frequency modulated RF signals, amplitude modulated RF signals, and/or phase modulated RF signals. Non-limiting examples of modulated RF signals, any one or more of which may be generated by waveform generator 110, include linear frequency modulated signals (also termed "chirps"), non-linearly frequency modulated signals, binary phase coded signals, signals modulated using one or more codes (e.g., Barker codes, bi-phase codes, minimum peak sidelobe codes, pseudo-noise (PN) sequence codes, quadri-phase codes, poly-phase codes, Costas codes, Welti codes, complementary (Golay) codes, Huffman codes, variants of Barker codes, Doppler-tolerant pulse compression signals, impulse waveforms, noise waveforms, and non-linear binary phase coded signals. Waveform generator 110 may be configured to generate continuous wave RF signals or pulsed RF signals. Waveform generator 110 may be configured to generate RF signals of any suitable duration (e.g., on the order of microseconds, milliseconds, or seconds).

In some embodiments, waveform generator 110 may be configured to generate microwave and/or millimeter wave RF signals. For example, waveform generator 110 may be configured to generate RF signals having a center frequency in a given range of microwave and/or millimeter frequencies (e.g., 4-7.5 GHz, 50-70 GHz). It should be appreciated that an RF signal having a particular center frequency is not limited to containing only that particular center frequency (the RF signal may have a non-zero bandwidth). For example, waveform generator 110 may be configured to generate a chirp having a center frequency of 60 GHz whose instantaneous frequency varies from a lower frequency (e.g., 59 GHz) to an upper frequency (e.g., 61 GHz). Thus, the generated chirp has a center frequency of 60 GHz and a bandwidth of 2 GHz and includes frequencies other than its center frequency.

As another example, waveform generator 110 may be configured to generate a chirp having a center frequency of 5.75 GHz whose instantaneous frequency varies from a lower frequency (e.g., 4 GHz) to an upper frequency (e.g., 7.5 GHz). Thus, the generated chirp has a center frequency of 5.75 GHz and a bandwidth of 3.5 GHz and includes frequencies other than its center frequency.

In some embodiments, waveform generator 110 may be configured to generate RF signals having a lower center frequency than the RF signals transmitted by antenna 115. In such embodiments, the transmit and receive circuitry may transform the RF signals generated by the waveform generator (e.g., using one or more frequency multipliers in conjunction with one or more amplifiers to counteract losses incurred by the multipliers) to have the desired frequency content upon transmission. For example, waveform generator 110 may generate RF signals having a center frequency of 7.5 GHz, which may be processed by three frequency doublers to obtain RF signals having a center frequency of 60 GHz.

In some embodiments, transmit and receive circuitry 112 may be configured to provide RF signals generated by waveform generator 110 to RF coupler 114, which in turn provides the RF signals to antenna 115. For example, transmit and receive circuitry 112 may provide RF signals to the coupled port of RF coupler 114 and the RF coupler may provide these RF signals to antenna 115 through its input port via electromagnetic coupling. In this manner, antenna 115 transmits RF signals received by the antenna 115 at the input port of the RF coupler 114 via coupling to RF signals received (from the transmit and receive circuitry 114) at the coupled port of RF coupler 114. Such a configuration is described in more detail herein including with reference to FIGS. 4A-4C.

Additionally, transmit and receive circuitry 112 may be configured to obtain and process RF signals received by the antenna 115 and provided to the transmit and receive circuitry 112 through the RF coupler 114. For example, antenna 115 may receive wireless RF signals and provide them to the input port of RF coupler 114, which in turn forwards these RF signals to the transmit and receive circuitry via its output port. Such a configuration is described in more detail herein including with reference to FIGS. 4A-4C.

In some embodiments, transmit and receive circuitry 112 may be configured to: (1) provide, via RF coupler 114, a first RF signal (e.g., RF signal 111) to the antenna 115 for transmission to target device 104; (2) obtain, via RF coupler 114, a responsive second RF signal (e.g., RF signal 113) received by the antenna 115 and generated by the target device 104 in response to receiving the transmitted first RF signal; and (3) process the received second RF signal by mixing it (e.g., using a frequency mixer) with a transformed version of the first RF signal to obtain a mixed RF signal. The resulting mixed RF signal may be indicative of a time-of-flight between the interrogator 102 and the target device 104. As such, the resulting mixed RF signal may be indicative of the distance between the interrogator 102 and the target device 104; that distance may be obtained from the mixed RF signal as described herein. The transmit and receive circuitry 112 may be configured to provide mixed RF signals to control circuitry 118, which may (with or without performing further processing the RF signals obtained from circuitry 112) provide the RF signals to external communications module 120.

In some embodiments, the transformed version of the first RF signal may be obtained by the transmit and receive circuitry 112 by transforming the first RF signal in a manner analogous to the processing performed on received RF signals by the target device 104 to generate the responsive RF signals (e.g., when the target device doubles the frequency of the receive RF signals prior to transmitting them back, the transformed version of the first RF signal may be obtained by passing the first RF signal through a frequency doubler). In this way, the center frequency of the transformed version of the first RF signal may be the same as the center frequency of the responsive second RF signal received by the antenna 115.

In some embodiments, antenna 115 may be a wideband RF antenna configured to receive and transmit RF signals across a wide range of frequencies. Antenna 115 may be a single-port antenna. Antenna 115 may be capable of transmitting RF signals having a first center frequency and receiving RF signals having a second center frequency different from the first center frequency. In some embodiments, the second center frequency may be a harmonic (e.g., a first harmonic) of the first center frequency. For example, antenna 115 may be configured to transmit RF signals having a center frequency in the range of 4-7.5 GHz and receive RF signals having a center frequency in the range of 8-15 GHz. As another example, antenna 115 may be configured to transmit C-band RF signals and receive X-band RF signals. As another example, antenna 115 may be configured to transmit RF signals having a center frequency in the range of 50-140 GHz and receive RF signals having a center frequency in the range of 100-140 GHz.

In some embodiments, the antenna 115 may be a circularly polarized antenna such that it is configured to transmit and receive circularly-polarized RF signals. For example, antenna 115 may be configured to transmit and receive RF signals having right-handed circular polarization. As another example, antenna 115 may be configured to transmit and receive RF signals having left-handed circular polarization.

Circularly polarized RF signals may be referred to as having right-handed circular polarization or left-handed circular polarization depending on the direction in which the electric field rotates from the perspective of the source. Accordingly, a circularly polarized RF signal has right-handed circular polarization when, upon pointing the right thumb away from the source in the same direction that the circularly polarized signal is propagating, the electric filed rotates in the direction of the curled fingers of the right hand. Right-handed circular polarization may also be referred to as "clockwise" circular polarization. On the other hand, a circularly polarized RF signal has left-handed circular polarization when, upon pointing the left thumb away from the source in the same direction that the circularly polarized signal is propagating, the electric filed rotates in the direction of the curled fingers of the left hand. Left handed circular polarization may also be referred to as "counter-clockwise" circular polarization. As may be appreciated from the foregoing, RF signals having right-handed (or clockwise) circular polarization and RF signals having left-handed (or counter-clockwise) circular polarization are circularly polarized in different and opposing directions.

In some embodiments, antenna 115 may have a tight phase center. An antenna may have a "tight phase center" when its phase center does not vary by more than 1 mm across all frequencies (at which the antenna operates) and across all angles within 60 degrees of the antenna's boresight. For example, antenna 115 may be an Archimedean spiral antenna, an exponential spiral antenna, a sinuous antenna, a log-periodic antenna, or any other suitable type of RF antenna having a tight phase center.

In some embodiments, RF coupler 114 may be a transmission line type coupler. For example, the RF coupler may have a main line, connecting its input and output ports and a coupled line connecting its couple and isolated ports. The coupled line and the main line may be electromagnetically coupled to one another. This is described in greater detail with reference to FIG. 5. In other embodiments, RF coupler 114 may be a waveguide directional coupler, a transformer-based coupler, or any other suitable type of coupler, as aspects of the technology described herein are not limited in this respect.

In some embodiments, control circuitry 118 may be configured to trigger the waveform generator 110 to generate an RF signal for transmission by the antenna 115. The control circuitry 118 may trigger the waveform generator in response to a command to do so received by external communications interface 120 and/or based on logic part of control circuitry 118.

In some embodiments, control circuitry 118 may be configured to receive RF signals from transmit and receive circuitry 112 and forward the received RF signals to external communications interface 120 for sending to control system 106. In some embodiments, control circuitry 118 may be configured to process the RF signals received from transmit and receive circuitry 112 and forward the processed RF signals to external communications interface 120. Control circuitry 118 may perform any of numerous types of processing on the received RF signals including, but not limited to, converting the received RF signals to from analog to digital (e.g., by sampling using an ADC), performing a Fourier transform to obtain a time-domain waveform, estimating a time of flight between the interrogator and the target device from the time-domain waveform, and determining an estimate of distance between the interrogator 102 and the target device that the interrogator 102 interrogated. The control circuitry 118 may be implemented in any suitable way and, for example, may be implemented as an application specific integrated circuit (ASIC), a field programmable gate array (FPGA), a combination of logic circuits, a microcontroller, or a microprocessor.

Techniques for estimating a time of flight between the interrogator and the target devices using the transmitted and received RF signals are described in further detail in U.S. Pat. App. Pub. No. 2017/0181118, titled "RADIO-FREQUENCY LOCALIZATION TECHNIQUES AND ASSOCIATED SYSTEMS, DEVICES, AND METHODS", which is incorporated by reference herein in its entirety.

External communications module 120 may be of any suitable type and may be configured to communicate according to any suitable wireless protocol(s) including, for example, a Bluetooth communication protocol, an IEEE 802.15.4-based communication protocol (e.g., a "ZigBee" protocol), and/or an IEEE 802.11-based communication protocol (e.g., a "WiFi" protocol).

As shown in FIG. 2, target device 104 includes antenna 125, RF coupler 126, signal transformation circuitry 124, control circuitry 128, and external communications module 130. It should be appreciated that, in some embodiments, a target device may include one or more other components in addition to or instead of the components illustrated in FIG. 2.

In the illustrated embodiment, antenna 125 is configured to provide received wireless RF signals having a first center frequency to (e.g., an input port of) RF coupler 126, which in turn is configured to forward the RF signals to signal transformation circuitry 124 (e.g., via its output port). The signal transformation circuitry 124 may be configured to transform the RF signals having the first center frequency to RF signals having a second center frequency different from (e.g., a harmonic of) the first center frequency. The signal transformation circuitry is configured to provide the transformed RF signals to (e.g., a coupled port of) RF coupler 126, which in turn is configured to provide them for transmission to antenna 125 (e.g., via the input port of the RF coupler). In turn, the antenna 125 is configured transmit transformed RF signals having the second center frequency. This configuration is described in more detail herein including with reference to FIGS. 3A and 3B.

In some embodiments, the antenna 125 may be a wideband RF antenna configured to receive and transmit RF signals across a wide range of frequencies. Antenna 125 may be a single-port antenna. Antenna 125 may be capable of receiving RF signals having a first center frequency and transmitting RF signals having a second center frequency different from the first center frequency. In some embodiments, the second center frequency may be a harmonic (e.g., a first harmonic) of the first center frequency. For example, antenna 125 may be configured to receive RF signals having a center frequency in the range of 4-7.5 GHz and transmit RF signals having a center frequency in the range of 8-15 GHz. As another example, antenna 125 may be configured to receive C-band RF signals and transmit X-band RF signals. As another example, antenna 125 may be configured to receive RF signals having a center frequency in the range of 50-140 GHz and transmit RF signals having a center frequency in the range of 100-140 GHz. In some embodiments, the antenna 125 may be a circularly polarized antenna such that it is configured to transmit and receive circularly-polarized RF signals. For example, antenna 125 may be configured to transmit and receive RF signals having right-handed circular polarization. As another example, antenna 125 may be configured to transmit and receive RF signals having left-handed circular polarization.

In some embodiments, antenna 125 may have a tight phase center. For example, antenna 115 may be an Archimedean spiral antenna, an exponential spiral antenna, a sinuous antenna, a log-periodic antenna, or any other suitable type of RF antenna having a tight phase center.

In some embodiments, RF coupler 126 may be a transmission line coupler or any other suitable type of RF coupler described herein. In some embodiments, RF coupler 126 and RF coupler 124 may be the same type of coupler, though in other embodiments this need not be the case.

In some embodiments, the interrogator antenna 115 may be a directional antenna. This may be useful in applications where some information is known about the region of space in which the target device is located (e.g., the target device is located in front of the interrogator, to the front left of the interrogator, etc.). Even if the target device is attached to a moving object (e.g., an arm of an industrial robot, a game controller), the movement of the target device may be constrained so that the target device is always within a certain region of space relative to the interrogator so that using a directional antenna to focus on that region of space increases the sensitivity of the interrogator to signals generated by the target device. In turn, this increases the distance between the interrogator and target device at which the micro-localization system may operate with high accuracy. However, it should be appreciated that in some embodiments, the interrogator antenna may be isotropic (omnidirectional), as aspects of the technology described herein are not limited in this respect.

In some embodiments, the target device antenna 125 may be isotropic so that the target device may be configured to receive signals from and/or provide RF signals to an interrogator located in any location relative to the target device. This is advantageous because, in some applications of micro-localization, the target device may be moving and its relative orientation to one or more interrogators may not be known in advance. However, in some embodiments, the target device antenna may be directional (anisotropic), as aspects of the technology described herein are not limited in this respect.

In some embodiments, control circuitry 128 may be configured to turn the target device 104 on or off (e.g., by powering off one or more components in signal transformation circuitry 124) in response to a command to do so received via external communications interface 130. The control circuitry 128 may be implemented in any suitable way and, for example, may be implemented as an application specific integrated circuit (ASIC), a field programmable gate array (FPGA), a combination of logic circuits, a microcontroller, or a microprocessor. External communications module 130 may be of any suitable type including any of the types described herein with reference to external communications module 120.

As discussed above with reference to FIG. 1, multiple interrogator devices may be utilized in order to determine a location of a target device. In some embodiments, each of the interrogator devices may be configured to transmit an RF signal to a target device, receive a responsive RF signal from the target device (the responsive signal may have a different polarization and/or a different center frequency from the signal that was transmitted), and process the transmitted RF signal together with the received RF signal to obtain an RF signal indicative of the distance between the interrogator device and the target device. The RF signals indicative of the distances between the interrogator devices and the target device may be processed (e.g., by the interrogators or another processor) to obtain estimates of the distances between the target device and each of the interrogators. In turn, the estimated distances may be used to determine the location of the target device in 2D space and/or in 3D space.

Figure 3A:
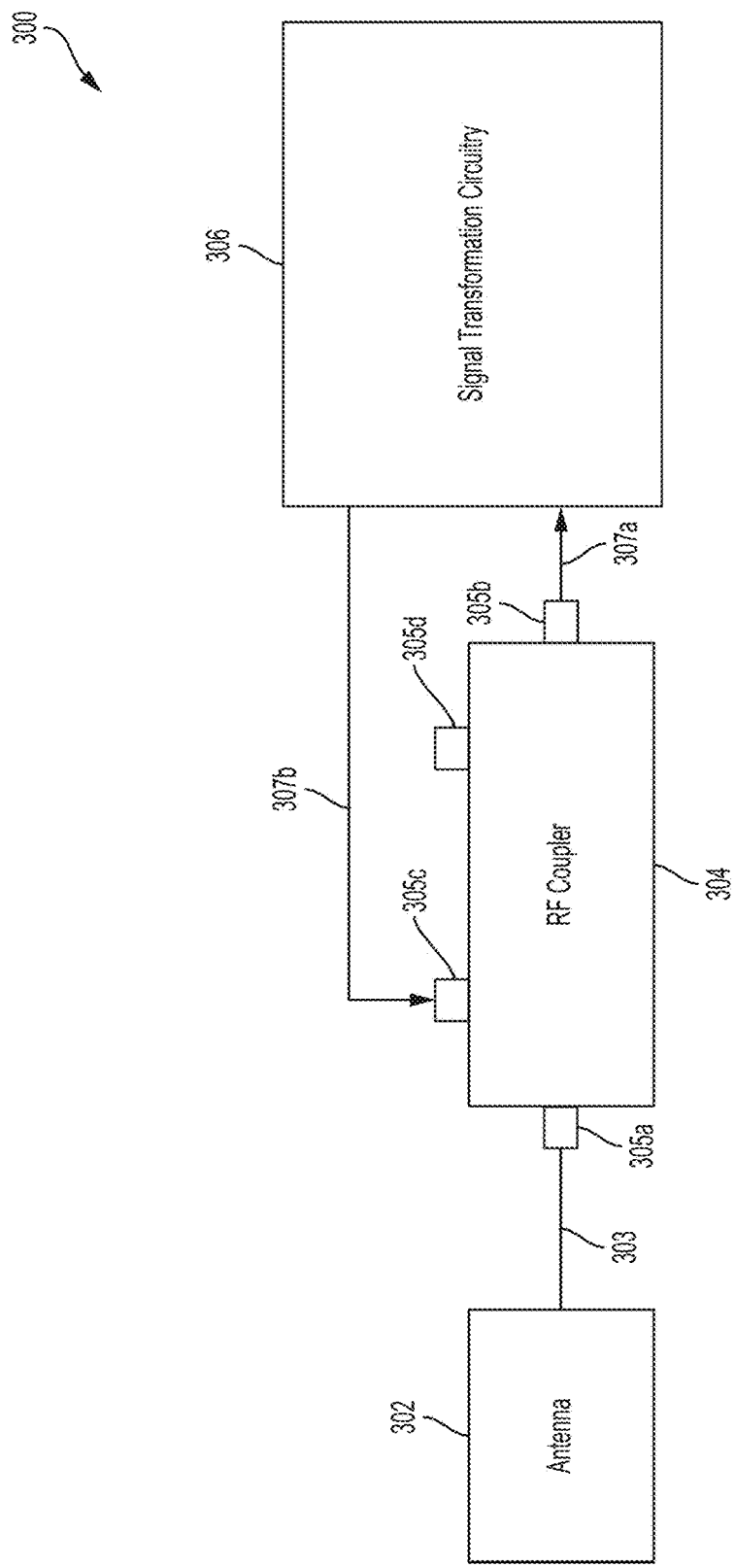
FIG. 3A is a diagram of an illustrative target device, in accordance with some embodiments of the technology described herein.

FIG. 3A is a diagram of an illustrative target device 300, in accordance with some embodiments of the technology described herein. In the illustrative embodiment of FIG. 3A, target device 300 includes antenna 302, RF coupler 304, and signal transformation circuitry 306. RF coupler 304 includes input port 305a, output port 305b, coupled port 305c, and isolated port 305d. It should be appreciated that, in some embodiments, target device 300 may include one or more other components in addition to or instead of the components illustrated in FIG. 3A. For example, an external communications module, such as external communications module 130 described with reference to FIG. 2), may be included.

As shown in FIG. 3A, the antenna 302 is connected, via line 303, to the input port 305a of RF coupler 304. The RF coupler 304 is connected to signal transformation circuitry 306. In particular, the output port 305b of RF coupler 304 is connected, via line 307a, to an input of signal transformation circuitry 306. In addition, an output of signal transformation circuitry 306 is connected, via line 307b, to the coupled port 305c of RF coupler 304.

In the illustrative embodiment of FIG. 3A, antenna 302 provides received wireless RF signals, via line 303, to the input port 305a of RF coupler 304. The received RF signals may have a first center frequency. In turn, RF coupler 304 provides RF signals having the first center frequency through output port 305b, via line 307a, to an input of signal transformation circuitry 306. Signal transformation circuitry 306 transforms the RF signals having the first center frequency to RF signals having a second center frequency different from the first center frequency. For example, the second center frequency may be a harmonic (e.g., a first harmonic) of the first center frequency. The RF signals, having the second center frequency and output from signal transformation circuitry 306 are provided, via line 307b, to the coupled port 305c of RF coupler 304. The RF signals received via the coupled port 305c induce, in the RF coupler 304, corresponding RF signals having the second center frequency, which are then provided via the input port 305a to antenna 302. In turn, antenna 302 transmits RF signals having the second center frequency.

For example, antenna 302 may receive a wireless RF signal having a first center frequency and provide, via line 303 to the input port 305a of RF coupler 304, a first RF signal having the first center frequency and generated using the received wireless RF signal. The RF coupler 304 may generate a second RF signal having the first center frequency using the first RF signal and provide the second RF signal, via output port 305b and line 307a, to an input of signal transformation circuitry 306. The signal transformation circuitry may generate a third RF signal having a second center frequency different from the first center frequency (e.g., a harmonic of the first center frequency) using the second RF signal and provide the third RF signal, via line 307b, to the coupled port 305c of the RF coupler 304. The RF coupler 304 may generate a fourth RF signal having the second center frequency using the third RF signal and provide the fourth RF signal to the antenna 302 via input port 305a. For example, the fourth RF signal may be induced on the main line of the RF coupler as a result of the third RF signal being provided as input to the coupled port, which is connected to the coupled line of the RF coupler. In turn, the antenna 302 may transmit a wireless RF signal having the second center frequency and generated using the fourth RF signal.

In this way, in response to receiving, from an interrogator device, RF signals having a first center frequency, the target device 300, transmits to the interrogator device, RF signals having a second center frequency. For example, in some embodiments, the target device 300 may receive RF signals having a center frequency in the range of 4-7.5 GHz and transmit RF signals having a center frequency in the range of 8-15 GHz. As another example, in some embodiments, the target device 300 may receive RF signals having a center frequency in the range of 50-70 GHz and transmit RF signals having a center frequency in the range of 100-140 GHz.

In some embodiments, antenna 302 may be a wideband RF antenna configured to receive and transmit RF signals across a wide range of frequencies. Antenna 302 may be capable of receiving RF signals having a first center frequency and transmitting RF signals having a second center frequency different from the first center frequency. In some embodiments, the second center frequency may be a harmonic (e.g., a first harmonic) of the first center frequency. For example, antenna 302 may be configured to receive RF signals having a center frequency in the range of 4-7.5 GHz and transmit RF signals having a center frequency in the range of 8-15 GHz. As another example, antenna 302 may be configured to receive C-band RF signals and transmit X-band RF signals. As another example, antenna 302 may be configured to receive RF signals having a center frequency in the range of 50-140 GHz and transmit RF signals having a center frequency in the range of 100-140 GHz.

In some embodiments, the antenna 302 may be a circularly polarized antenna such that it is configured to transmit and receive circularly-polarized RF signals. For example, antenna 302 may be configured to transmit and receive RF signals having right-handed circular polarization. As another example, antenna 302 may be configured to transmit and receive RF signals having left-handed circular polarization.

In some embodiments, antenna 302 may have a tight phase center. For example, antenna 302 may be an Archimedean spiral antenna, an exponential spiral antenna, a sinuous antenna, a log-periodic antenna, or any other suitable type of RF antenna having a tight phase center.

In some embodiments, RF coupler 304 may be a transmission line type coupler. For example, the RF coupler may have a main line, connecting the input port 305a and the output 305b, and a coupled line connecting the coupled port 305c and the isolated port 305d. The coupled line and the main line may be electromagnetically coupled to one another. This is described in greater detail with reference to FIG. 5. In other embodiments, RF coupler 304 may be a waveguide directional coupler, a transformer-based coupler, or any other suitable type of coupler, as aspects of the technology described herein are not limited in this respect.

In some embodiments, signal transformation circuitry 306 may be configured to transform RF signals having a first center frequency to RF signals having a second center frequency. Additionally, in some embodiments, signal transformation circuitry 306 may be configured to amplify received RF signals (e.g., to counteract losses to be imparted to the RF signals as a result of frequency multiplication and/or coupling losses incurred in the RF coupler). Additionally or alternatively, the signal transformation circuitry 306 may be configured to filter the RF signals using one or more filters (e.g., one or more low-pass, band-pass, or high-pass filters).

Figure 3B:
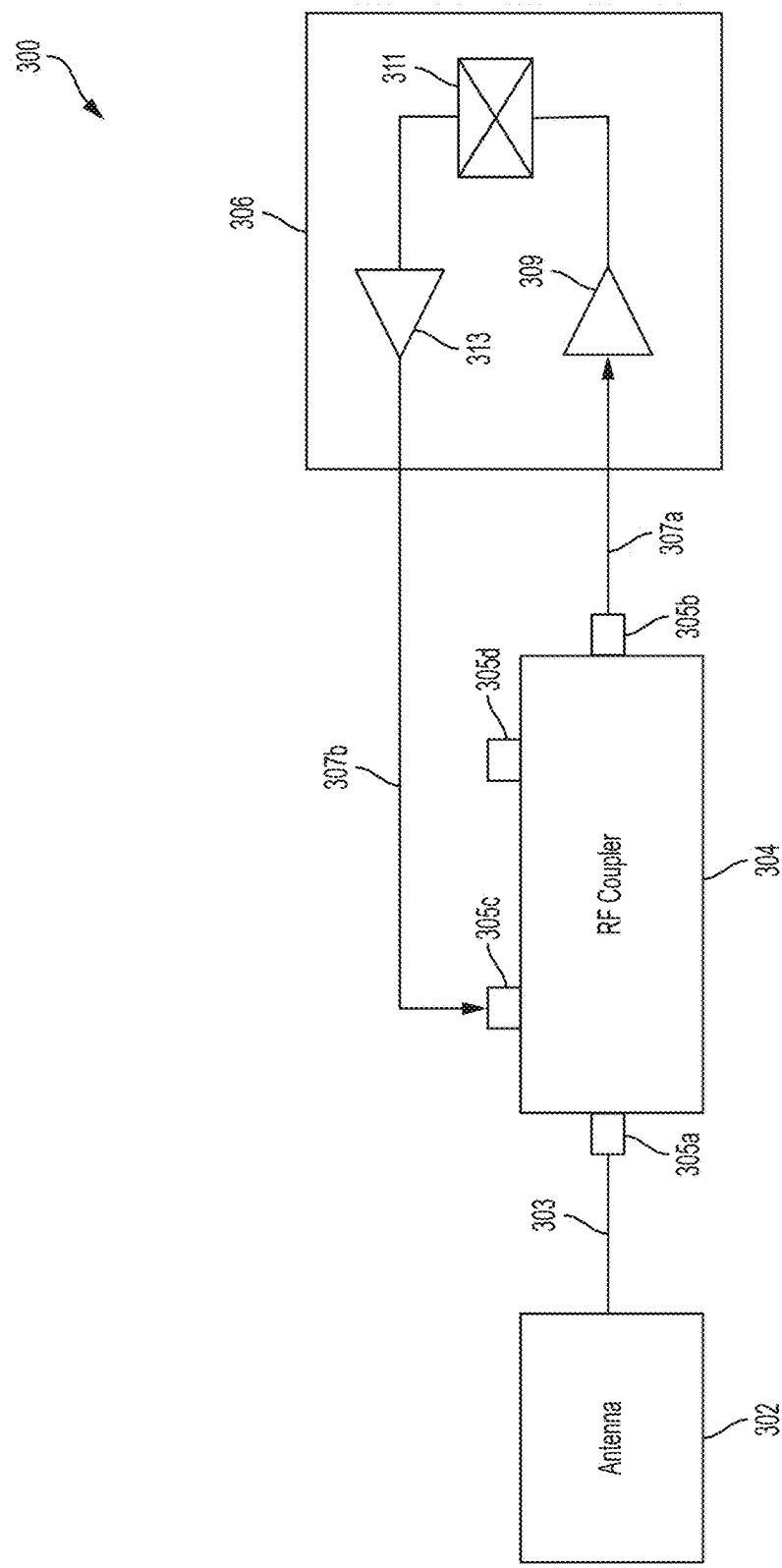
FIG. 3B is a diagram showing illustrative components of signal transformation circuitry of the target device shown in FIG. 3A, in accordance with some embodiments of the technology described herein.

For example, in the illustrative embodiment shown in FIG. 3B, signal transformation circuitry 306 includes amplifier 309, frequency multiplier 311, and amplifier 313. Signals output by RF coupler 304 through output port 305 may be provided to amplifier 309 via line 307a. The amplifier 309 amplifies signals received via line 307a and provides the amplified signals to frequency multiplier 311. The frequency multiplier 311 generates output signals whose frequency is a multiple of the frequency of the input signals received from amplifier 309 and provides the output signals to amplifier 313. The amplifier 313 amplifies signals received from frequency multiplier 311 and provides the amplified signals to the coupled port 305c of the RF coupler 304 via line 307b.

In some embodiments, frequency multiplier 311 may receive input signals having a center frequency of $f_0$ and generate output signals having a center frequency that is an integer multiple of $f_0$. For example, frequency multiplier 311 may receive input signals having a center frequency of $f_0$ and generate output signals having a center frequency of $2f_0$, $3f_0$, $4f_0$, $8f_0$, $10f_0$, or any other suitable integer multiple of $f_0$, as aspects of the technology described herein are not limited in this respect. As one example, in some embodiments, frequency multiplier 908 may receive input signals having a center frequency in a range of 50-70 GHz (e.g., 61.25 GHz) and generate output signals having a center frequency in a range of 100-140 GHz (e.g., 122.5 GHz). As another example, in some embodiments, frequency multiplier 311 may receive input signals having a center frequency in a range of 4-7.5 GHz (e.g., 5 GHz) and generate output signals having a center frequency of 8-14 GHz (e.g., 10 GHz).

In some embodiments, frequency multiplier 311 may be implemented as a cascade of frequency multipliers, which cascade may include one or more amplifiers and/or one or more filters between successive frequency multipliers. For example, in some embodiments, frequency multiplier 311 may be configured to output signals having a center frequency that is four times the center frequency of the input signals provided to frequency multiplier 311. In such an example, frequency multiplier may be implemented as a single "4×" frequency multiplier or a sequence of two "2×" frequency multipliers, each of which is configured to output signals having a center frequency that is double the center frequency of the input signals provided to it. One or more amplifiers and/or filters may be provided between the "2×" frequency multipliers.

In some embodiments, frequency multiplier 311 may include a non-linear circuit. The non-linear circuit may distort input signals provided to frequency multiplier 311 to generate signals having center frequencies that are multiples of the center frequencies of the input signals. Additionally, frequency multiplier 311 may include one or more (e.g., bandpass) filters for selecting a desired center frequency for the output signals (e.g., a desired harmonic frequency) and removing the fundamental and/or one or more other harmonic frequency components from the non-linearly distorted signals.

In some embodiments, the non-linear circuit in a frequency multiplier 311 may be a diode. Frequency multiplier 311 may be any suitable type of diode frequency multiplier. For example, in some embodiments, frequency multiplier 311 may be a Schottky diode, a silicon diode, a varistor-type diode frequency multiplier, a varactor-type frequency multiplier, a step recover diode frequency multiplier, or a PIN diode frequency multiplier, any (e.g., all) of which may or may not be biased with a quiescent bias current.

In the illustrated embodiment of FIG. 3B, each of amplifiers 309 and 313 may be of any suitable type and may be used to induce any suitable amount of gain to the input signals. In some embodiments, the gain of amplifier 309 may be greater than the gain of amplifier 313, and, in some instances, may be significantly greater than the gain of amplifier 313. For example, the gain of amplifier 309 may be at least 10, 20, 30, 40, 50, or 100 times the gain of amplifier 313. Having amplifier 309 induce a greater amount of gain than amplifier 313 provides as much drive power as possible to the frequency multiplier. In addition, less power is needed to induce power gain at lower frequencies (before the signals pass through a frequency multiplier) than to induce the same amount of power gain at higher frequencies (after the signals pass through the frequency multiplier). Thus, inducing a greater amount of gain via amplifier 309, reduces the overall power consumption requirements of the signal transformation circuitry, which is advantageous.

In some embodiments, amplifier 313 may be used to amplify the RF signals to counteract the coupling to be incurred in the RF coupler 304. That coupling loss may be 5-15 dB in some embodiments. Accordingly, amplifier 313 and one or more other amplifiers in the signal transformation circuitry may be used to achieve a gain sufficient (e.g., at least 5-20 dB) to compensate for the coupling loss that will be incurred in the RF coupler (when the antenna 302 picks up signals induced by the RF signals provided via the coupled port).

As may be appreciated from FIG. 3B, the inclusion of frequency multiplier 311 in the signal transformation circuitry 306 causes RF signals provided to coupled port 305c, via line 307b, to have higher frequencies than the RF signals output from output port 305b, via line 307a. Accordingly, in some embodiments, antenna 302 may be configured to receive RF signals having a first center frequency transmit RF signals having a second center frequency different from the first center frequency. For example, the second center frequency may be a harmonic of the first frequency. As a specific example, the second center frequency may be twice the first center frequency (e.g., when the frequency multiplier 311 receives input signals having a center frequency of $f_0$ and generates output signals having a center frequency of $2f_0$).

The target device 300 may be manufactured in any of numerous ways. For example, in some embodiments, the target device 300 may comprise a substrate, with antenna 302, RF coupler 304, and signal transformation circuitry 306 realized as discrete components mounted on the substrate. In other embodiments, the target device 300 may comprise a substrate (e.g., a printed circuit board) having the antenna 302 fabricated thereon, and a semiconductor die mounted on the substrate, coupled to the antenna 302, and having the RF coupler 304 and the signal transformation circuitry 306 fabricated thereon. In such embodiments, the RF coupler 304 and signal transformation circuitry 306 may be integrated circuitry monolithically integrated with the semiconductor die. In some embodiments, the semiconductor die may be flip-chip bonded to the substrate. In some embodiments, the substrate may comprise a printed circuit board having at least one conductive layer, and the antenna 302 may be fabricated on the substrate by patterning the at least one conductive layer.

It should be appreciated that the embodiment illustrated in FIGS. 3A and 3B is illustrative and that there are variations. For example, although in the illustrated embodiment a single amplifier 309 is shown between RF coupler 304 and frequency multiplier 311, in other embodiments there may be zero, two, three, four, five or more amplifiers between RF coupler 304 and frequency multiplier 311. As another example, although in the illustrated embodiment, a single amplifier 313 is shown between frequency multiplier 311 and RF coupler 304, in other embodiments there may be zero, two, three, four, five or more amplifiers between frequency multiplier 311 and RF coupler 304. In some embodiments, the number and gain of the amplifiers in the signal chain from output port 305b to the coupled port 305c may be determined based on an overall amount of gain desired to induce to the signal and in view of an amount of loss induced by the frequency multiplier 311 and the coupling loss in the RF coupler 304. For example, in some embodiments, one or multiple amplifiers (e.g., amplifiers 309 and 313) that provide at least 30 dB (or at least 40 dB, at least 50 dB, at least 60 dB, etc.) of gain overall may be introduced into the signal chain between the output port 305b and the coupled port 305c. As another example of a variation of the embodiments shown in FIG. 3B, there may be one or more filters between any pair of circuits along the signal path from the output port 305b and the coupled port 305c.

Figure 4A:
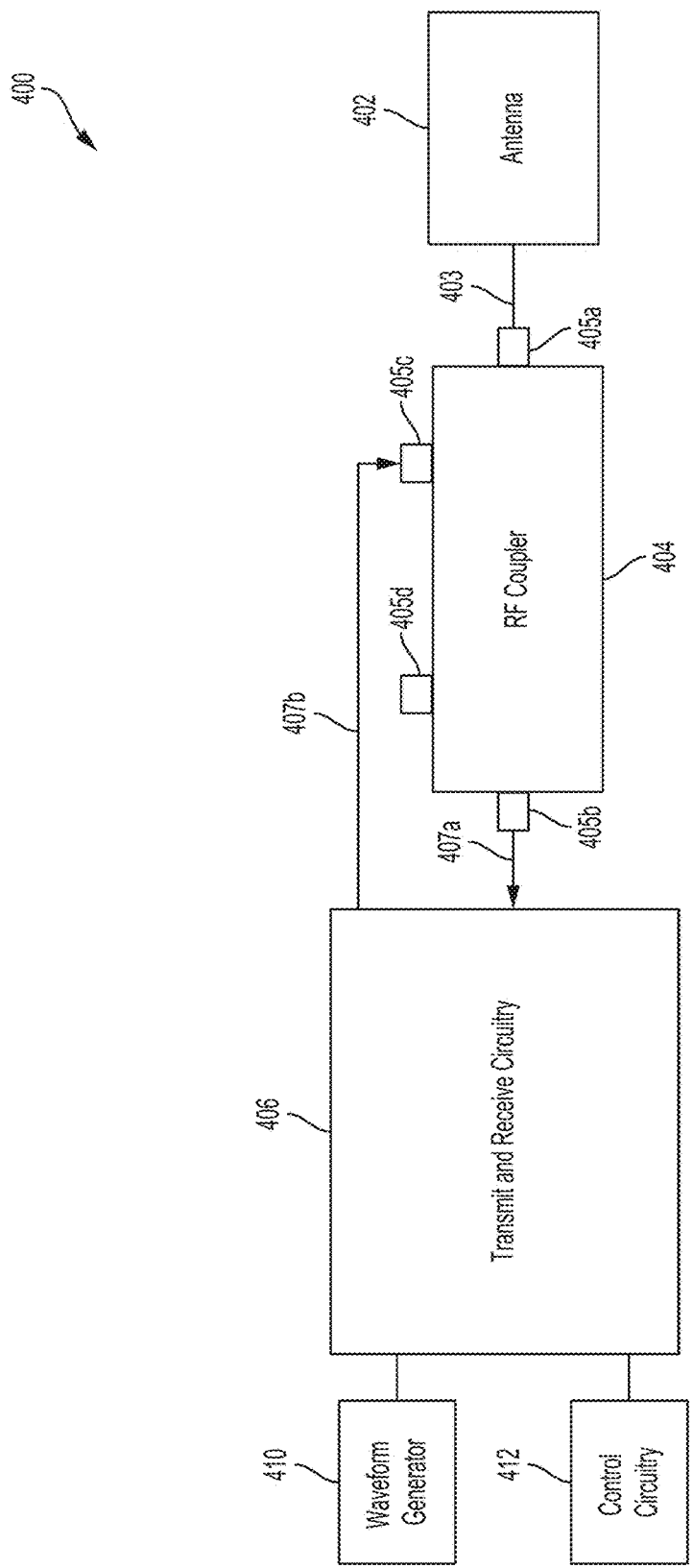
FIG. 4A is a diagram of an illustrative interrogator device, in accordance with some embodiments of the technology described herein.

FIG. 4A is a diagram of an illustrative interrogator device 400, in accordance with some embodiments of the technology described herein. In the illustrative embodiment of FIG. 4A, interrogator device 400 includes antenna 402, RF coupler 404, transmit and receive circuitry 406, waveform generator 410, and control circuitry 412. RF coupler 404 includes input port 405a, output port 405b, coupled port 405c, and isolated port 405d. It should be appreciated that, in some embodiments, interrogator device 400 may include one or more other components in addition to or instead of the components illustrated in FIG. 4A. For example, an external communications module, such as external communications module 120 described with reference to FIG. 2), may be included.

As shown in FIG. 4A, the antenna 402 is connected, via line 403, to the input port 405a of RF coupler 404. The RF coupler 404 is connected to transmit and receive circuitry 406. In particular, the output port 405b of RF coupler 404 is connected, via line 407a, to an input of transmit and receive circuitry 406. In addition, an output of transmit and receive circuitry 406 is connected, via line 407b, to the coupled port 405c of RF coupler 404.

In some embodiments, transmit and receive circuitry 406 may include transmit circuitry that, using signals provided by waveform generator 410, generates RF signals for transmission by antenna 402. The RF signals generated in the transmit and receive circuitry 406 are provided, via line 407b, to the coupled port 405c of the RF coupler 404. In turn, antenna 402 transmits, to a target device, RF signals received at the input port 405a via coupling to signals received at the coupled port 405c.

In some embodiments, antenna 402 receives wireless RF signals from a target device and provides the received RF signals, via line 403, to the input port 405a of the RF coupler 404. In turn, RF signals, which are generated based on the RF signals received through the input port 405a, are provided to transmit and receive circuitry 406, through output port 405b and via line 407a. The transmit and receive circuitry 406 may use the received RF signals to generate signals indicative of a time-of-flight and/or distance between the interrogator device and the target device.

For example, in some embodiments, the transmit and receive circuitry 406 may be configured to: (1) provide, via RF coupler 404, a first RF signal to the antenna 402 for transmission to a target device (e.g., target device 104); (2) obtain, via RF coupler 404, a responsive second RF signal received by antenna 402 and generated by the target device in response to receiving the transmitted first RF signal; and (3) process the received RF signal by mixing it with a transformed version of the first RF signal to obtain a mixed RF signal. The resulting mixed RF signal may be indicative of a time-of-flight between the interrogator 400 and the target device. As such, the resulting mixed RF signal may be indicative of the distance between the interrogator 400 and the target device; that distance may be obtained from the mixed RF signal as described herein. In some embodiments, the transmit and receive circuitry 406 may be configured to provide mixed RF signals to control circuitry 412, which may (with or without performing further processing the RF signals obtained from circuitry 406) provide the RF signals to another component (e.g., an external communications module).

Figure 4B:
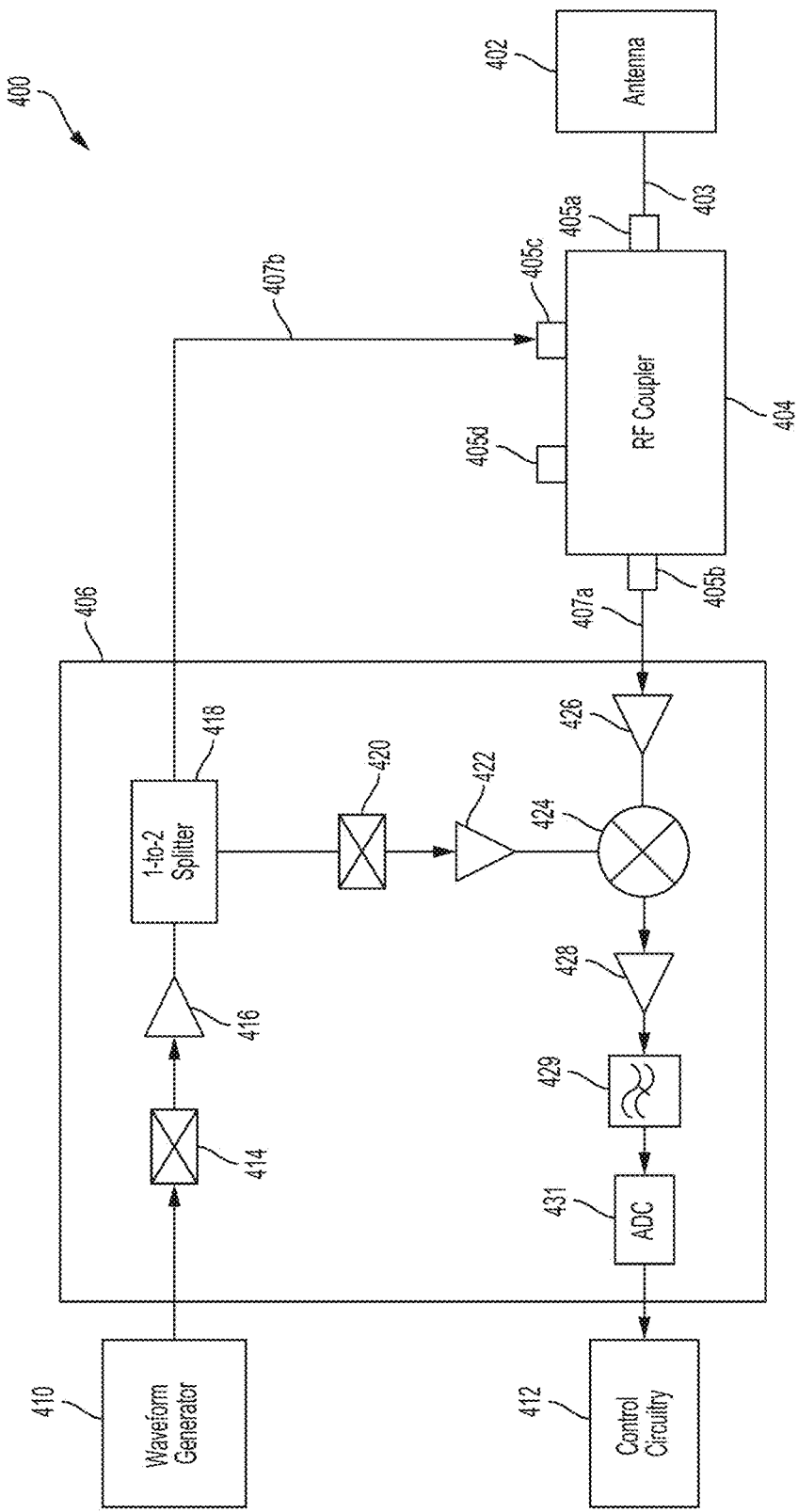
FIG. 4B is a diagram showing illustrative components of transmit and receive circuitry of the interrogator device shown in FIG. 4A, in accordance with some embodiments of the technology described herein.

FIG. 4B is a diagram showing an illustrative embodiment of transmit and receive circuitry 406. Each of the illustrated components of transmit and receive circuitry 406 may be of any suitable type, as aspects of the technology described herein are not limited in this respect. As shown in FIG. 4B, transmit and receive circuitry 406 includes a transmit signal chain comprising frequency multiplier 414, which is connected to amplifier 416, which is connected to splitter 418. In the illustrated embodiment, the transmit signal chain is configured to provide, via RF coupler 404, a first RF signal to the antenna 402 for transmission to a target device. For example, RF signals generated by the waveform generator 410 may be transformed by frequency multiplier 414, amplified by amplifier 416 and then provided, via splitter 418, to the coupled port 405c of RF coupler 404 to be transmitted by antenna 402. For example, RF signals having a center frequency of 3 GHz may be generated by waveform generator 410, processed by frequency multiplier 414 to obtain RF signals having a center frequency of 6 GHz, which are then provided, via amplifier 416, splitter 418, and RF coupler 404, to antenna 402 for transmission. As another example, RF signals having a center frequency of 7.5 GHz may be generated by waveform generator 410, processed by frequency multiplier 414 to obtain RF signals having a center frequency of 60 GHz (frequency multiplier 414 need not be a doubler), which are then provided, via amplifier 416, splitter 418, and RF coupler 404, to antenna 402 for transmission. In other embodiments, the waveform generator 410 may be configured to generate RF signals at the frequency at which they are to be transmitted by antenna 402. In such embodiments, frequency multiplier 414 (and, optionally, amplifier 416) may be omitted from the transmit signal chain.

In some embodiments, amplifier 416 may be used to amplify the RF signals in order to counteract the coupling to be incurred in the RF coupler 404. That coupling loss may be 5-15 dB in some embodiments. Accordingly, amplifier 414 and/or one or more other amplifiers may be employed to achieve a gain sufficient (e.g., at least 5-20 dB) to compensate for the coupling loss that will be incurred in the RF coupler (when the antenna 402 picks up signals induced by the RF signals provided via the coupled port).

As shown in FIG. 4B, transmit and receive circuitry also includes a receive signal chain comprising amplifier 426, mixer 424, amplifier 428, filter 429, and analog-to-digital (ADC) converter 431. In the illustrated embodiment, the receive signal chain is configured to, obtain, via RF coupler 404, a responsive second RF signal received by antenna 402 and generated by the target device in response to receiving the transmitted first RF signal. In the illustrated embodiment, the receive signal chain is also configured to process the responsive second RF signal by mixing it with a transformed version of the first RF signal to obtain a mixed RF signal. As shown in FIG. 4B, the mixer 424 is configured to mix the responsive second RF signal (after it is amplifier by amplifier 426) with a transformed version of the first RF signal obtained by transforming the RF signal provided from splitter 410 by using frequency multiplier 420 and amplifier 422. In the illustrated embodiment, the resulting mixed RF signal provided at the output of mixer 424 is amplified by amplifier 428, filtered by filter 429, and digitized using ADC 431.

In some embodiments, the mixed RF signal generated by mixer 424 may be indicative of the time of flight between the interrogator 400 and the target device that provided the responsive signal. Thus, the mixed RF signal may be used to determine the time of flight and/or distance between the interrogator 400 and the target device. For example, the mixed RF signal may be used to determine the distance between the phase center of antenna 402 on the interrogator and the phase center of the antenna on the target device.

In the illustrative embodiment of FIG. 4B, RF signals transmitted to a target device are transformed using frequency multiplier 420 to obtain transformed RF signals having the same center frequency (e.g., $2f_0$) as the RF signals received by antenna 402 from the target device. Thus, the RF signals being mixed by frequency mixer 424, and subsequently digitized by ADC 431, have the center frequency of $2f_0$. In other embodiments, instead of transforming transmitted RF signals, the received RF signals may be transformed instead by a frequency divider circuit to obtain transformed RF signals having the same center frequency (e.g., $f_0$) as the transmitted RF signals. In such embodiments, the RF signals being mixed by frequency mixer 424, and subsequently digitized by ADC 431, have the center frequency of $f_0$, which may reduce the cost and/or improve the performance of the frequency mixer 424 and/or ADC 431.

In some embodiments, antenna 402 may be a wideband RF antenna configured to receive and transmit RF signals across a wide range of frequencies. Antenna 402 may be a single-port antenna. Antenna 402 may be capable of transmitting RF signals having a first center frequency and receiving RF signals having a second center frequency different from the first center frequency. In some embodiments, the second center frequency may be a harmonic (e.g., a first harmonic) of the first center frequency. For example, antenna 402 may be configured to transmit RF signals having a center frequency in the range of 4-7.5 GHz and receive RF signals having a center frequency in the range of 8-15 GHz. As another example, antenna 402 may be configured to transmit C-band RF signals and receive X-band RF signals. As another example, antenna 402 may be configured to transmit RF signals having a center frequency in the range of 50-140 GHz and receive RF signals having a center frequency in the range of 100-140 GHz.

In some embodiments, the antenna 402 may be a circularly polarized antenna configured to transmit and receive circularly-polarized RF signals. For example, antenna 402 may be configured to transmit and receive RF signals having right-handed or left-handed circular polarization.

In some embodiments, antenna 402 may have a tight phase center. For example, antenna 115 may be an Archimedean spiral antenna, an exponential spiral antenna, a sinuous antenna, a log-periodic antenna, or any other suitable type of RF antenna having a tight phase center.

In some embodiments, RF coupler 404 may be a transmission line type coupler. For example, the RF coupler may have a main line, connecting its input and output ports and a coupled line connecting its coupled and isolated ports. The coupled line and the main line may be electromagnetically coupled to one another. This is described in greater detail with reference to FIG. 5. In other embodiments, RF coupler 404 may be a waveguide directional coupler, a transformer-based coupler, or any other suitable type of coupler, as aspects of the technology described herein are not limited in this respect.

In some embodiments, waveform generator 410 may be configured to generate any RF signals of any suitable type including frequency-modulated waveforms. For example, waveform generator 410 may be configured to generate linear frequency modulated waveforms and/or any other waveform described with reference to waveform generator 110 shown in FIG. 2.

The interrogator 400 may be manufactured in any of numerous ways. For example, in some embodiments, the interrogator 400 may comprise a substrate, with antenna 402, RF coupler 404, and transmit and receive circuitry 406 realized as discrete components mounted on the substrate. In some embodiments, the antenna may be on a separate substrate from the substrate on which the RF coupler 404 and transmit and receive circuitry 406 are mounted. In other embodiments, the interrogator 400 may comprise a substrate (e.g., a printed circuit board) having the antenna 402 fabricated thereon, and a semiconductor die mounted to the substrate, coupled to the antenna 402, and having the RF coupler 404 and the transmit and receive circuitry 406 fabricated thereon. In such embodiments, the RF coupler 404 and the circuitry 406 may be integrated circuitry monolithically integrated with the semiconductor die. In some embodiments, the semiconductor die may be flip-chip bonded to the substrate. In some embodiments, the substrate may comprise a printed circuit board having at least one conductive layer, and the antenna 402 may be fabricated on the substrate by patterning the at least one conductive layer.

It should be appreciated that the embodiment illustrated in FIGS. 4A and 4B is illustrative and that there are variations. For example, in some embodiments, there may be zero, one, two, three, or any other suitable number of amplifiers of any suitable type between any pair of circuits shown in FIG. 4B. As another example, there may be zero, one, two, three, or any other suitable number of filters of any suitable type between any pair of circuits shown in FIG. 4B. As another example, although in the illustrated embodiment ADC 431 is part of transmit and receive circuitry 406 so that digitized waveforms are output from the transmit and receive circuitry 406 to control circuitry 412, in other embodiments ADC 431 may not be part of transmit and receive circuitry 406 and, instead, may be further downstream in the processing chain. In such embodiments, analog waveforms may be output from the transmit and receive circuitry 406 to control circuitry 412.

Figure 4C:
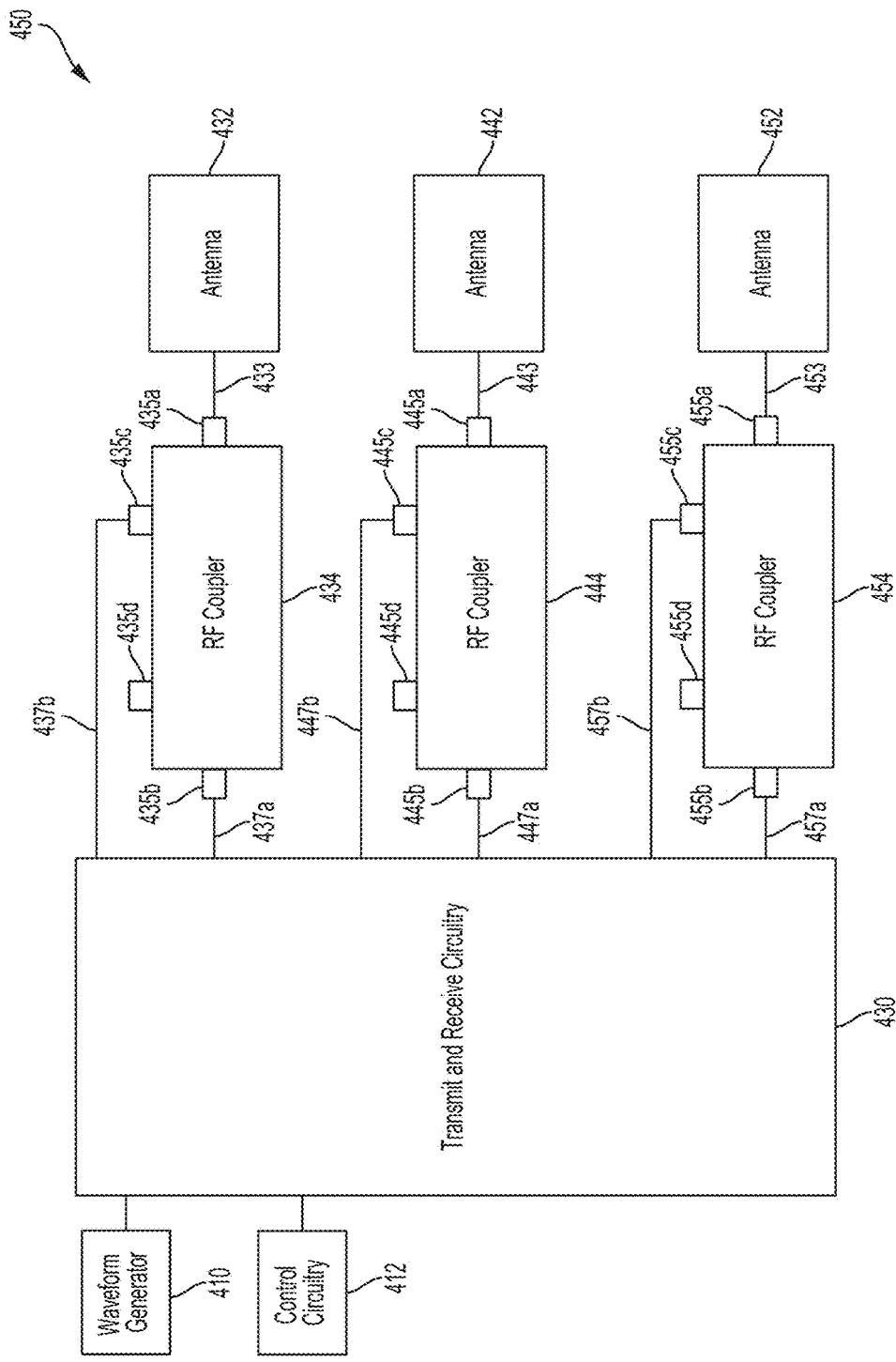
FIG. 4C is a diagram of another illustrative interrogator device, in accordance with some embodiments of the technology described herein.

In the embodiment illustrated in FIGS. 4A and 4B, the interrogator device 400 includes a single RF antenna 402. However, in other embodiments, an interrogator device may include multiple RF antennas, as aspects of the technology described herein are not limited in this respect. One such embodiment is illustrated in FIG. 4C, which shows an interrogator device 450 having three antennas 432, 442, and 452. It should be appreciated that an interrogator may include any suitable number of antennas (e.g., one, two, three, four, five, six, seven, etc.), as aspects of the technology described herein are not limited in this respect.

As shown in FIG. 4C, the antenna 432 is connected, via line 433, to the input port 435a of RF coupler 434. The RF coupler has input port 435a, output port 435b, coupled port 435c, and isolated port 435d. The RF coupler 434 is connected to transmit and receive circuitry 430. In particular, the output port 435b of RF coupler 434 is connected, via line 437a, to an input of transmit and receive circuitry 430. In addition, an output of transmit and receive circuitry 430 is connected, via line 437b, to the coupled port 435c of RF coupler 434.

As also shown in FIG. 4C, the antenna 442 is connected, via line 443, to the input port 445a of RF coupler 444. The RF coupler has input port 445a, output port 445b, coupled port 445c, and isolated port 445d. The RF coupler 444 is connected to transmit and receive circuitry 430. In particular, the output port 445b of RF coupler 444 is connected, via line 447a, to an input of transmit and receive circuitry 430. In addition, an output of transmit and receive circuitry 430 is connected, via line 447b, to the coupled port 445c of RF coupler 444.

As also shown in FIG. 4C, the antenna 452 is connected, via line 453, to the input port 455a of RF coupler 454. The RF coupler has input port 455a, output port 455b, coupled port 455c, and isolated port 455d. The RF coupler 454 is connected to transmit and receive circuitry 430. In particular, the output port 455b of RF coupler 454 is connected, via line 457a, to an input of transmit and receive circuitry 430. In addition, an output of transmit and receive circuitry 430 is connected, via line 457b, to the coupled port 455c of RF coupler 454.

In some embodiments, the transmit and receive circuitry 430 may generate RF signals and provide them to one or more of RF couplers 434, 444, and 454 for transmission by antennae 432, 442, and 452, respectively.

In some embodiments, the transmit and receive circuitry 430 may obtain, from one or more of RF couplers 434, 444, and 454, RF signals received by antennas 432, 442, and 452 respectively. In this way, the transmit and receive circuitry 430 can obtain one or more mixed RF signals indicating the distance between the phase centers of each of one or more of the antennas 432, 442, and 452 and the phase center of the antenna on the target device. In turn, such distances, when used together with the locations on of the antennas 432, 442, and 452, may be used to determine the 2D and/or 3D location of the target device.

Figure 5:
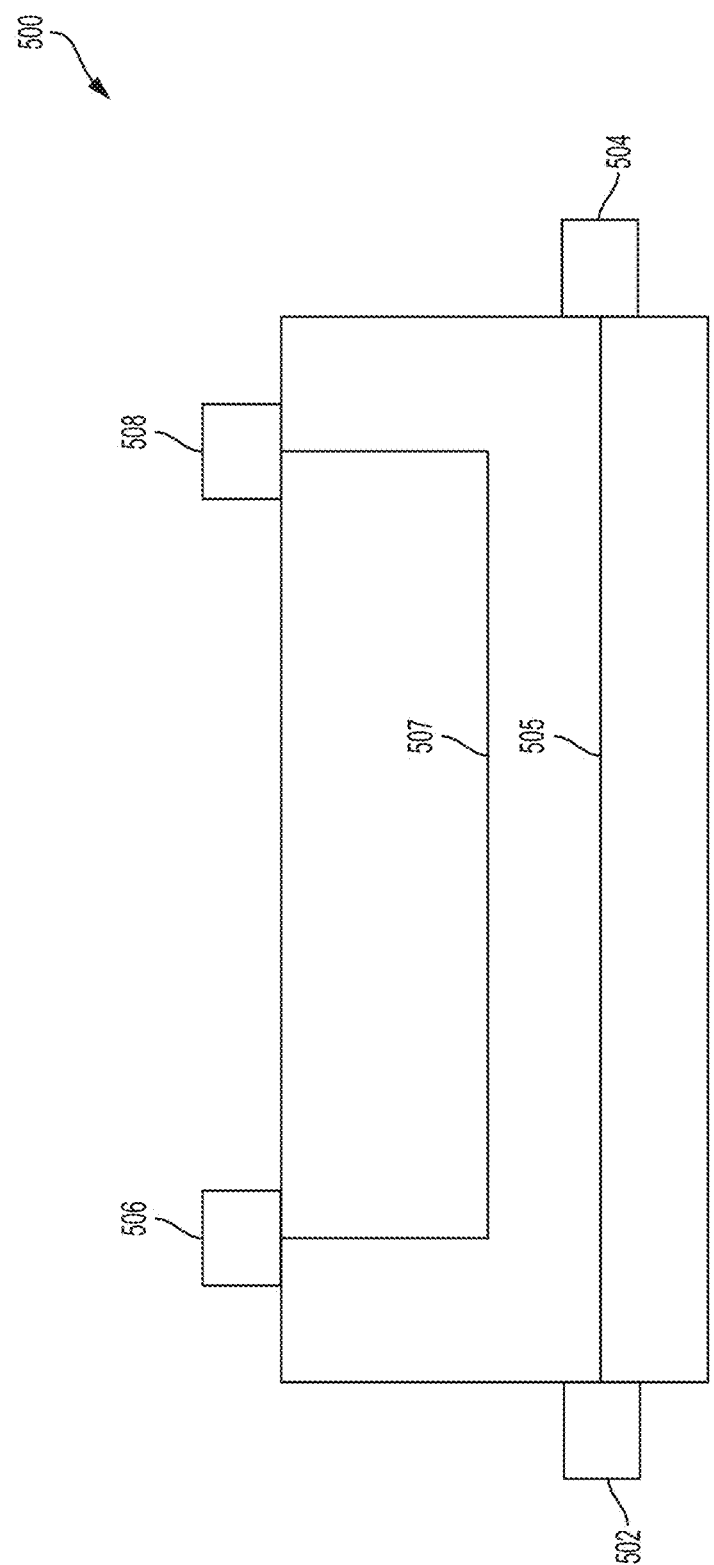
FIG. 5 is a diagram of an illustrative RF coupler, in accordance with some embodiments of the technology described herein.

FIG. 5 is a diagram of an illustrative RF coupler 500, in accordance with some embodiments of the technology described herein. RF coupler 500 includes input port 502, output port 504, coupled port 506, and isolated port 508. RF coupler 500 further includes a main line 505 having the input port 502 at its first end and the output port 504 at its second end, and a coupled line having the coupled port 506 at its first end and isolated port 508 at its second end.

In some embodiments, the main line 505 and the coupled line 507 may be electromagnetically coupled such that RF signals on the coupled line 507 induce corresponding RF signals on the main line 505. As a result, RF signals provided as inputs to coupled port 506 (e.g., from signal transformation circuitry, such as signal transformation 306) may induce corresponding RF signals on the main line 505. In some embodiments in which an RF antenna is connected to input port 502, the RF antenna may be configured to provide received RF signals to the input port 502 and to transmit RF signals received from the input port 502 via coupling of the main line 505 and the coupled line 507.

In some embodiments, the main line 505 and the coupled line 507 may be coupled transmission lines. For example, the main line 505 and coupled line 507 may be edge coupled. As another example, the main line 505 and coupled line 507 may be broadside coupled.

In some embodiments, the main line 505 may be implemented using striplines and/or microstrips. In some embodiments, the coupled line 507 may be implemented using striplines and/or microstrips. For example, in some embodiments, the main line and the coupled line comprise striplines. As another example, in some embodiments, the main line and the coupled line comprise microstrips.

In some embodiments, the coupling loss between the main line 505 and the coupled line 507 is between 5 and 15 dB. In some embodiments, the coupling loss between the main line 505 and the coupled line 507 is between 8 and 12 dB. For example, the coupling loss between the main line 505 and the coupled line 507 may be substantially (e.g., within 5%) of 10 dB.

It should be appreciated that although in the illustrative embodiment of FIG. 5, RF coupler 500 is shows as being implemented using two coupled lines, other types of RF couplers may be used in other embodiments. For example, an RF coupler implemented using one or more transformers or in any other suitable way, as aspects of the technology described herein are not limited in this respect.

Figure 6:
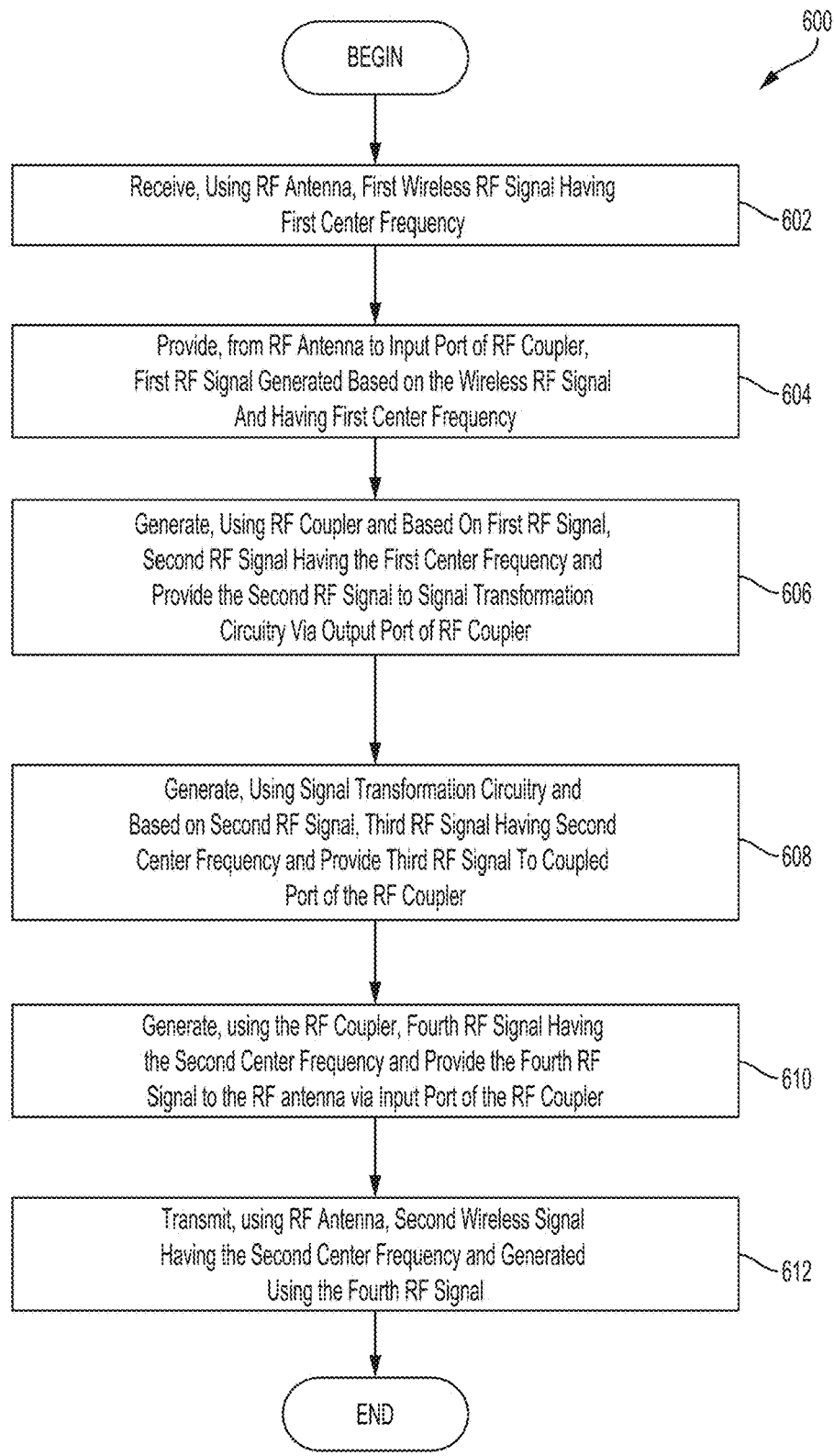
FIG. 6 is a flowchart of an illustrative method, performed by a target device, of providing an RF signal having a second center frequency to an interrogator device in response to receiving an RF signal having a first center frequency from the interrogator device, in accordance with some embodiments of the technology described herein.

FIG. 6 is a flowchart of an illustrative method 600, performed by a target device, of providing an RF signal having a second center frequency to an interrogator device in response to receiving an RF signal having a first center frequency from the interrogator device, in accordance with some embodiments of the technology described herein. The method 600 may be performed by any suitable target device described herein including, for example, target device 104 or target device 300.

Process 600 begins at act 602, where the target device receives, using its RF antenna, a first wireless RF signal having a first center frequency. The target device may receive the first wireless RF signal from an interrogator (e.g., interrogator 102 or interrogator 400). In some embodiments, the first center frequency may be any suitable microwave frequency. For example, the first wireless RF signal may have a center frequency in the range of 4-7.5 GHz. As another example, the first wireless RF signal may have a center frequency in the range of 50-70 GHz. In some embodiments, the first RF signal may be a linear frequency modulated signal.

Next, at act 604, the RF antenna generates a first RF signal having the first center frequency based on the received first wireless RF signal and provides the first RF signal to an input port of an RF coupler part of the target device.

Next, at act 606, the RF coupler generates a second RF signal having the first center frequency based on the first RF signal and provides the second RF signal to signal transformation circuitry part of the target device. In some embodiments, the RF coupler may comprise a main line connecting the input port the output port, and the second RF signal may be obtained at the output port as a result of inputting the first RF signal at the input port.

Next, at act 608, the signal transformation circuitry generates a third RF signal using the second RF signal and provides the generated third RF signal to a coupled port of the RF coupler. The third RF signal has a second center frequency different from the first center frequency. For example, the second center frequency is a harmonic (e.g., a first harmonic) of the first center frequency. As one example, the first center frequency may be in the range of 4.0-7.5 GHz and the second center frequency may be in the range of 8.0-15 GHz. As another example, the first center frequency may be in the range of 50-70 GHz and the second center frequency may be in the range of 100-140 GHz.

Next, at act 610, the RF coupler generates a fourth RF signal having the second frequency based on the third RF signal and provides the generated fourth RF signal to the RF antenna via the input port of the RF coupler. In some embodiments, the fourth RF signal is generated via coupling between the coupled port and the input port in the RF coupler. For example, in some embodiments, the RF coupler may have a main line connecting the input and output ports and a coupled line connecting the coupled and isolated ports, and the fourth RF signal may be generated on the main line as a result of electromagnetic coupling between the main line and the coupled line.

Next, at act 612, the RF antenna transmits a second wireless RF signal having the second center frequency and generated using the fourth RF signal provided to the RF antenna through the input RF port. The transmitted second wireless RF signal may be received by an interrogator that had transmitted the first wireless RF signal, and may be used by the interrogator to determine the distance between the interrogator and the target device using the techniques described herein.

As described herein, an interrogator may transmit an RF signal to a target device and receive a responsive RF signal from the target device. The transmitted RF signal together with the responsive RF signal may be used by the interrogator and/or other circuitry to determine the distance between the phase center of the interrogator's RF antenna and the phase center of the target device's RF antenna. In turn, distances between the phase center of each of multiple RF interrogator antennas (disposed on one interrogator or on multiple interrogators) and the phase center of the target device's RF antenna may be used to determine a precise (2D or 3D) location of the phase center of the target device's RF antenna.

In many applications, however, the location of interest may not be location of the phase center of the target device's RF antenna. For example, the target device may be mounted on an object, but the location of a specific point on that object may be of interest rather than the location of the phase center of the RF antenna on the target device. For example, in some applications, it may be important to determine the location of a specific point on the end of a robotic arm with high precision (e.g., within a millimeter). However, given how a target device is mounted on the robotic arm, that specific point of interest may be sufficiently far away from the phase center of the target device's RF antenna such that the location of the phase center itself is not a good proxy for the location of the specific point of interest.

Accordingly, the inventors have recognized that it is important, for some applications, to not only determine the precise location the phase center of a target device's RF antenna, but also to determine where that phase center is located relative to one or more points of interest on the target device and/or object to which the target device is mounted.

For example, if the phase center of the RF antenna on a target device is at point P1 and the location of interest on the target device and/or object on which the target device is mounted is point P2, then: (1) one or more interrogators may be used to determine the precise location of point P1; and (2) the location of point P2 may be determined using the location of point P1 and information indicating the relative location of points P1 and P2.

Accordingly, in some embodiments, the RF antenna of the target device may be mounted on a target device in a way that allows the location of the RF antenna's center to be determined relative to a reference location on the target device. In turn, the relative location of the phase center to the reference location and the relative location of that reference location to any point of interest on the target device (or on the object to which the target device is mounted) may be used to determine the location of the point of interest.

Figure 7A:
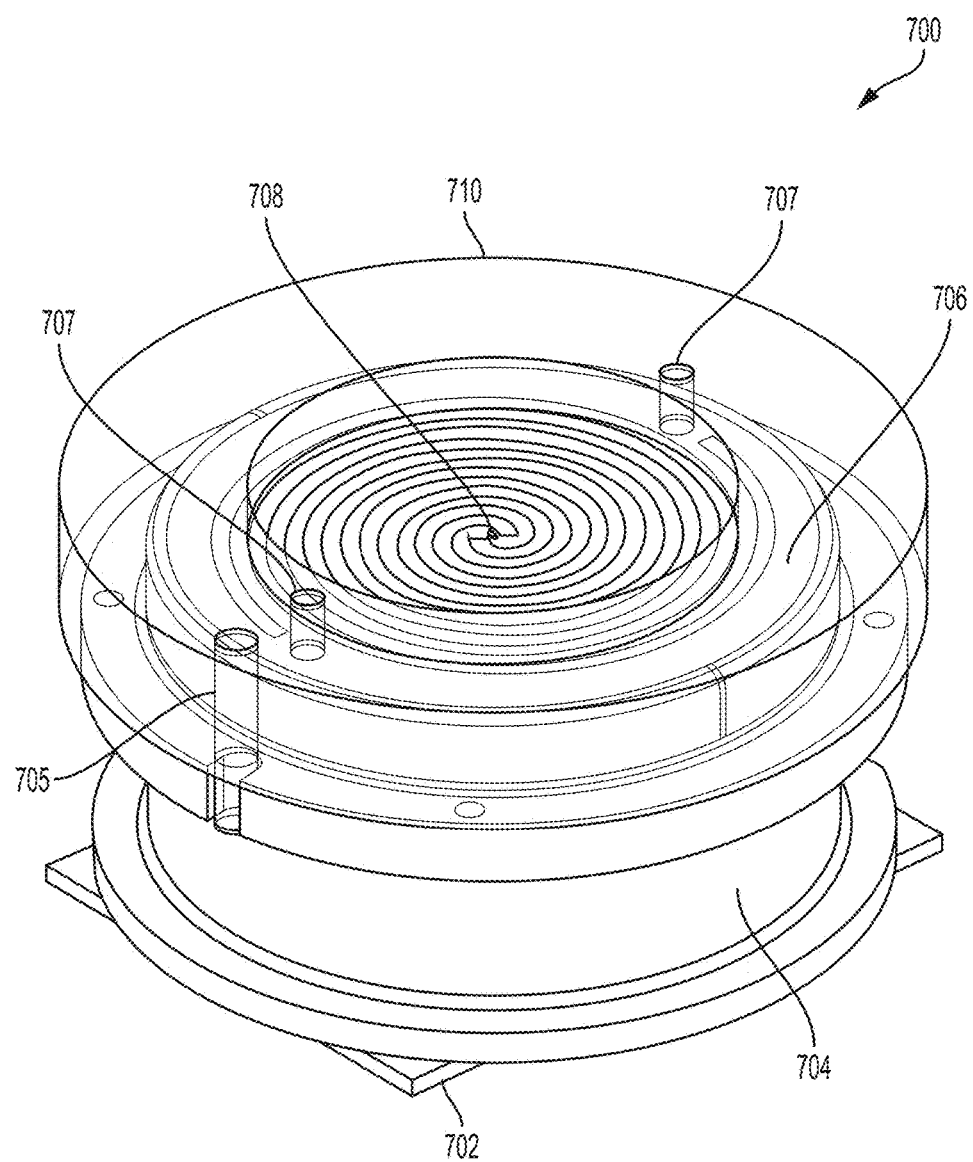
FIG. 7A is a diagram of an illustrative mount for mounting an RF antenna to a substrate, in accordance with some embodiments of the technology described herein.
Figure 7B:
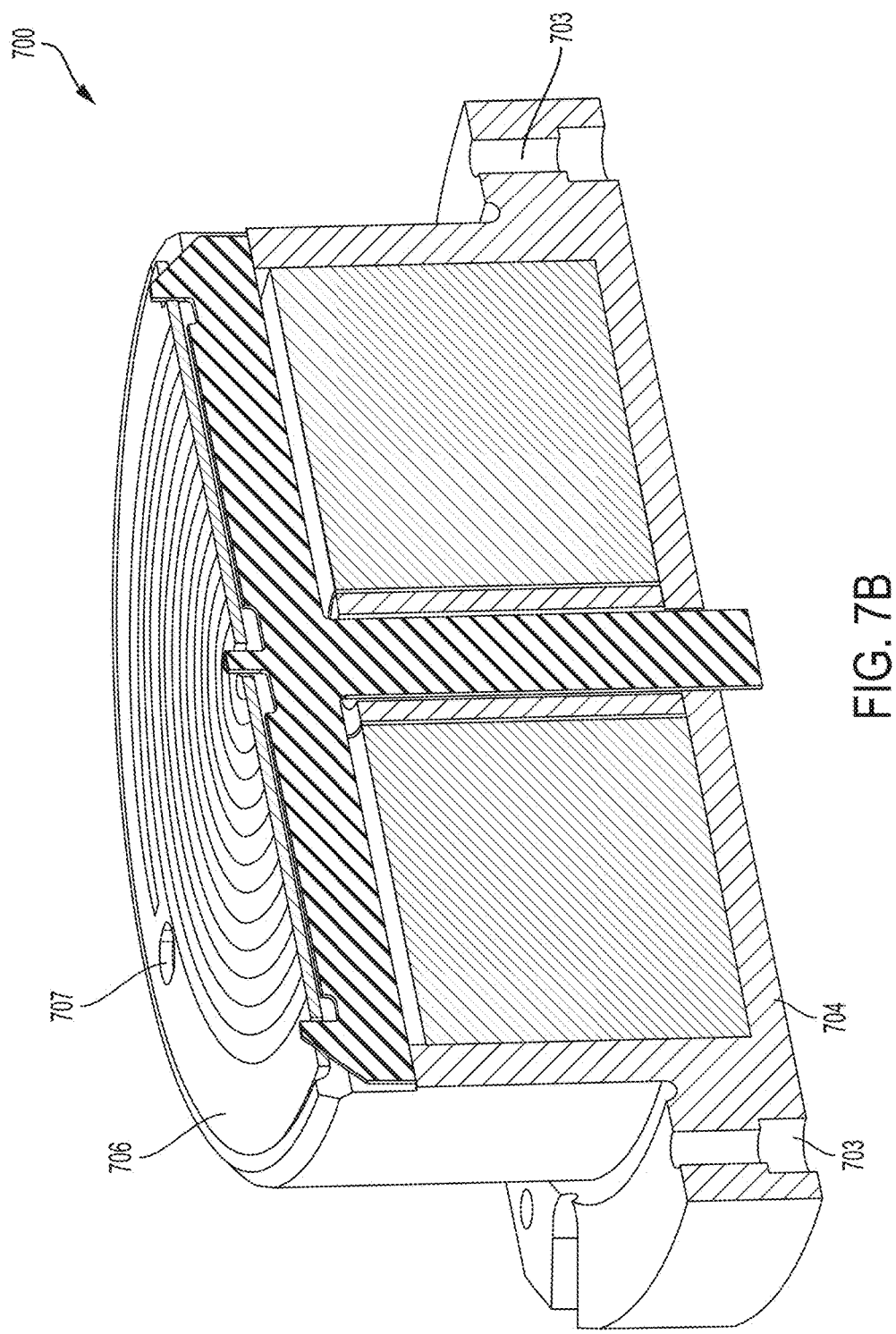
FIG. 7B is a cutaway view of the illustrative mount of FIG. 7B, in accordance with some embodiments of the technology described herein.
Figure 7C:
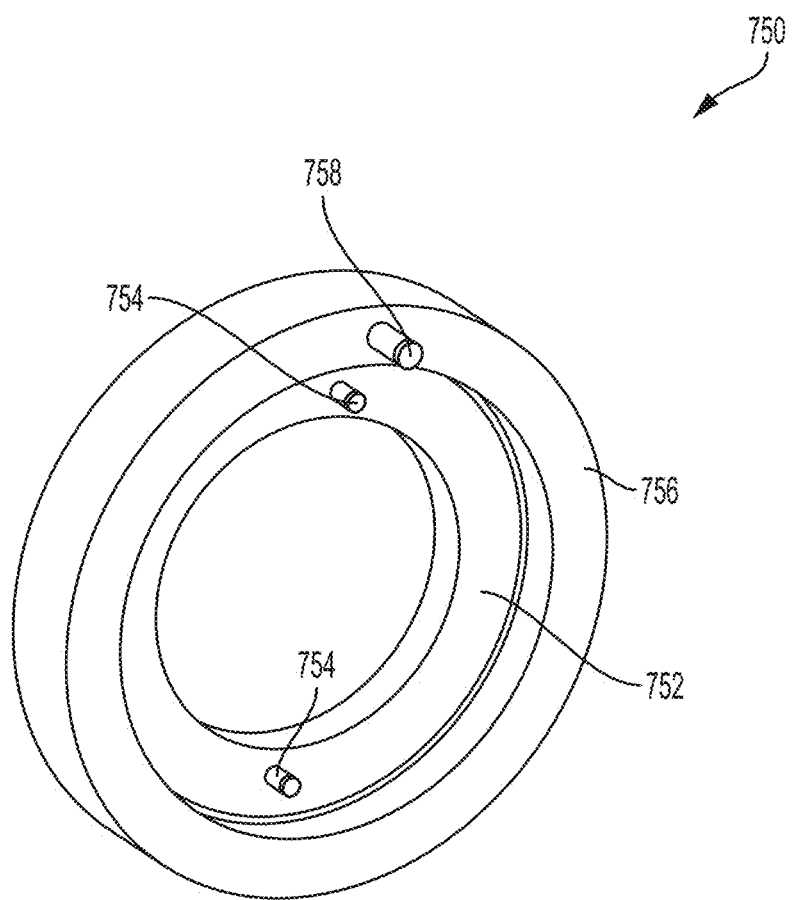
FIG. 7C is a diagram of an illustrative alignment device for attaching an RF antenna to the illustrative mount of FIG. 7A, in accordance with some embodiments of the technology described herein.

Accordingly, in some embodiments, the RF antenna of a target device may be precision-mounted to the target device using an alignment tool that allows for the determination of the relative locations of the phase center of the RF antenna and a reference point on the target device. FIGS. 7A-7C illustrate one embodiment for how to an antenna may be mounted using such an alignment tool.

As shown in FIG. 7A, RF antenna 706 having phase center located at point 708 may be attached to mount 704, which is disposed on a substrate 702 of a target device, using mounting holes 705 and 707. Although, in this example, RF antenna 706 is a spiral antenna, any of the other types of tight phase center antennas described herein may be utilized, as aspects of the technology described herein are not limited in this respect.

In some embodiments, the alignment tool 750, shown in FIG. 7C, may be used to perform the mounting process in a calibrated way such that the relative location of the phase center 708 of the RF antenna 706 and mounting hole 705 may be determined. In the illustrated embodiment, the alignment tool 750 is composed of two concentric rings: inner ring 752 having mounting pegs 754 and outer ring 756 comprising mounting peg 758. As may be seen from FIGS. 7A and 7C, the alignment tool 750 may be used to mount RF antenna 706 to mount 704 by inserting the inner ring pegs 754 into mounting holes 707 and the outer ring peg 758 into mounting hole 705. The inner and outer rings may be rotated relative to one another in order to place RF antenna 706 into a desired rotational orientation. After the antenna is positioned using alignment tool 750, the alignment tool 750 may be removed and the antenna may be covered with cover 710, as shown in FIG. 7A.

Since the relative locations of the mounting holes 707 and the antenna's phase center 708 are known (from manufacture), the alignment tool 750 may be used to determine the distance between the phase center 708 and mounting hole 705 (e.g., depending on the widths of the inner ring 752 and outer ring 756) and the angle of the line connecting phase center 708 and mounting hole 705 (e.g., depending on the degree of rotation of the inner ring 752 relative to the outer ring 756).

FIG. 7B shows a cutaway view of the illustrative mount of FIG. 7A, with reference numeral 703 indicating a mounting hole used for connecting mount 704 to substrate 702. As may be appreciated from FIGS. 7A-7C: (1) the relative locations of the antenna's phase center and mounting holes 707 may be known from manufacture of RF antenna 706; (2) the relative locations of the mounting holes 707 and mounting hole 705 may be determined using alignment tool 750; (3) the relative locations of mounting hole 705 and mounting hole 703 may be known from manufacture of mount 704; and (4) the relative locations of mounting hole 703 and any point of interest on substrate 702 may be known in advance. This information may be used to determine the relative locations of phase center 708 and a point of interest on substrate 702 of the target device (or any point of interest on the object to which the target device is mount) may be determined.

According, some embodiments provide for a method of manufacturing an RF interrogator device and/or an RF target device. The method comprising mounting an RF antenna to a substrate of the interrogator device (or to a substrate of the target device) using the alignment tool described herein. The alignment tool may be used to rotate the RF antenna into position such that one or more pegs may be used to couple the RF antenna to the substrate.

It should be appreciated that the above-described techniques are not limited to being applied for precision-mounting of an RF antenna on a target device, as the above-described techniques may be used for precision-mounting an RF antenna on an interrogator device, in some embodiments.

Having thus described several aspects some embodiments, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A target device, comprising:
    a radio frequency (RF) coupler comprising an input port, an output port and a coupled port;
    an antenna capable of receiving, from an interrogator device, RF signals having a first center frequency and transmitting RF signals having a second center frequency different from the first center frequency, the antenna connected to the RF coupler to provide received RF signals to the input port of the RF coupler and to transmit, to the interrogator device, RF signals received at the input port via coupling to signals received at the coupled port; and
    signal transformation circuitry having an input connected to the output port of the RF coupler to receive RF signals provided by the antenna to the input port and an output connected to the coupled port, the signal transformation circuitry configured to transform first RF signals having the first center frequency received from the output port to second RF signals having the second center frequency and to provide the second RF signals to the coupled port.

2. The target device of claim 1, wherein the RF coupler comprises:
    a main line having the input port at a first end and the output port at a second end; and a coupled line having the coupled port at a first end and an isolated port at a second end.

3. The target device of claim 2, wherein the antenna is connected to the RF coupler to provide received RF signals to the input port of the RF coupler and to transmit RF signals received from the input port via coupling of the main line and the coupled line.

4. The target device of claim 2, wherein the main line and the coupled line are coupled transmission lines.

5. The target device of claim 2, wherein the main line and the coupled line comprise striplines.

6. The target device of claim 2, wherein the main line and the coupled line comprise microstrips.

7. The target device of claim 2, wherein the main line and the coupled line have a coupling loss of 5-15 dB.

8. The target device of claim 1, wherein the antenna is configured to receive RF signals in a range of 4.0-7.5 GHz and transmit RF signals in a range of 8.0-15 GHz.

9. The target device of claim 1, wherein the antenna is configured to receive C-band RF signals and transmit X-band RF signals.

10. The target device of claim 1, wherein the antenna is configured to receive RF signals in a range of 50-70 GHz and transmit RF signals in a range of 100-140 GHz.

11. The target device of claim 1, wherein the antenna comprises Archimedean spiral antenna.

12. The target device of claim 1, wherein the antenna comprises an exponential spiral antenna.

13. The target device of claim 1, wherein the antenna comprises a sinuous antenna.

14. The target device of claim 1, wherein the antenna comprises a log-periodic antenna.

15. The target device of claim 1, wherein the antenna comprises a circularly polarized antenna.

16. The target device of claim 1, wherein the antenna is a single-port antenna.

17. The target device of claim 1, wherein the signal transformation circuitry comprises at least one frequency multiplier.

18. The target device of claim 1, wherein the signal transformation circuitry is configured to transform first RF signals having the first center frequency received to second RF signals having the second center frequency that is a harmonic of the first center frequency.

19. The target device of claim 18, wherein the harmonic is the first harmonic of the first center frequency.

20. The target device of claim 1, wherein the second center frequency is a harmonic of the first center frequency.

21. A method performed by a target device comprising a radio frequency (RF) antenna, an RF coupler having an input port, and output port, and a coupled port, and signal transformation circuitry, the method comprising:
    receiving, via the RF antenna from an interrogator device, a wireless RF signal having a first center frequency;
    providing, from the RF antenna to the input port of the RF coupler, a first RF signal generated based on the wireless RF signal and having the first center frequency;
    generating, using the RF coupler and based on the first RF signal, a second RF signal having the first center frequency and providing the second RF signal to the signal transformation circuitry via the output port of the RF coupler;
    generating, using the signal transformation circuitry and based on the second RF signal, a third RF signal having the second center frequency and providing the third RF signal to the coupled port of the RF coupler; and
    generating, using the RF coupler, a fourth RF signal having the second center frequency and providing the fourth RF signal to the RF antenna, for transmission to the interrogator device, via the input port of the RF coupler.

* * * * *